US006906641B2

United States Patent
Ishihara

(10) Patent No.: US 6,906,641 B2
(45) Date of Patent: *Jun. 14, 2005

(54) APPARATUS, METHOD AND COMPUTER PROGRAM PRODUCT FOR HELICOPTER ENHANCED GROUND PROXIMITY WARNING SYSTEM

(75) Inventor: Yasuo Ishihara, Kirkland, WA (US)

(73) Assignee: Honeywell International Inc., Morristown, NJ (US)

(*) Notice: Subject to any disclaimer, the term of this patent is extended or adjusted under 35 U.S.C. 154(b) by 703 days.

This patent is subject to a terminal disclaimer.

(21) Appl. No.: 09/865,333

(22) Filed: May 25, 2001

(65) Prior Publication Data

US 2002/0036574 A1 Mar. 28, 2002

Related U.S. Application Data

(60) Provisional application No. 60/207,515, filed on May 26, 2000, provisional application No. 60/207,740, filed on May 26, 2000, provisional application No. 60/207,998, filed on May 26, 2000, and provisional application No. 60/232,967, filed on Sep. 14, 2000.

(51) Int. Cl.$^7$ .............................................. G08B 21/00
(52) U.S. Cl. ........................... 340/946; 340/970; 701/9
(58) Field of Search .............................. 340/946, 970; 701/9, 14; 244/11, 17

(56) References Cited

U.S. PATENT DOCUMENTS

| | | | | |
|---|---|---|---|---|
| 6,304,800 B1 | * | 10/2001 | Ishihara et al. | 701/16 |
| 6,445,310 B1 | * | 9/2002 | Bateman et al. | 340/970 |
| 6,577,931 B2 | * | 6/2003 | Conner et al. | 701/14 |
| 6,583,733 B2 | * | 6/2003 | Ishihara et al. | 340/946 |
| 6,622,066 B2 | * | 9/2003 | Ishihara et al. | 701/9 |
| 6,707,394 B2 | * | 3/2004 | Ishihara et al. | 340/970 |
| 6,734,808 B1 | * | 5/2004 | Michaelson et al. | 340/984 |
| 6,737,987 B2 | * | 5/2004 | Conner et al. | 340/946 |
| 2002/0080145 A1 | * | 6/2002 | Ishihara | 345/589 |

* cited by examiner

Primary Examiner—John Tweel, Jr.
(74) Attorney, Agent, or Firm—Honeywell Int'l Inc.

(57) ABSTRACT

An apparatus, method and computer program product for alerting rotary wing aircraft of potentially hazardous proximity to terrain also reduces nuisance warnings and provides a terrain display consistent with the unique performance capabilities of such aircraft.

89 Claims, 14 Drawing Sheets

LOOK AHEAD DISTANCES VARY WITH GROUND SPEED AND DISTANCE TO RUNWAY
TERRAIN FLOOR VARIES WITH DISTANCE TO RUNWAY

MODE 1
EXCESSIVE DESCENT RATE
"SINKRATE"
"PULL UP!"

MODE 2
EXCESSIVE TERRAIN
CLOSURE RATE
"TERRAIN... TERRAIN"
"PULL UP!"

MODE 6
AUTOROTATION
ALTITUDE CALL-OUTS
"...ONE HUNDRED..."
BANK ANGLE
"BANK ANGLE"
TAIL STRIKE
"TAIL TOO LOW"

MODE 3
SINK AFTER TAKEOFF
"DON'T SINK"

MODE 5
EXCESSIVE DEVIATION
BELOW GLIDESLOPE
"GLIDESLOPE"

MODE 4
TOO CLOSE TO TERRAIN
"TOO LOW - TERRAIN"
"TOO LOW - GEAR"

*Fig.3*

LOOK AHEAD DISTANCES VARY WITH GROUND SPEED AND DISTANCE TO RUNWAY
TERRAIN FLOOR VARIES WITH DISTANCE TO RUNWAY

APPARATUS, METHOD AND COMPUTER PROGRAM PRODUCT FOR HELICOPTER ENHANCED GROUND PROXIMITY WARNING SYSTEM

CROSS REFERENCES TO RELATED APPLICATIONS

This application claims priority from U.S. Provisional application Ser. No. 60/207,515 titled "Terrain Floor Delta Height for Helicopter EGPWS Based on Ground Speed," filed May 26, 2000; and from U.S. Provisional application Ser. No. 60/207,740 titled "Terrain Awareness Display Coloring for Helicopter EGPWS Based on Ground Speed," filed May 26, 2000; and from U.S. Provisional application Ser. No. 60/207,998 titled "Look Ahead Distance for Helicopter EGPWS Based on Stopping Distance," filed May 26, 2000; the entire specifications of which are herein incorporated by reference.

This application is also related to U.S. Provisional application Ser. No. 60/232,967, titled: "Tail Strike Algorithm for Helicopters" and filed Sep. 14, 2000 and to application Ser. No. 09/865,365 filed the same day herewith and titled: "Method, Apparatus and Computer Program Product for Helicopter Tail Strike Warning".

BACKGROUND OF THE INVENTION

The present invention provides a ground proximity warning system and method for rotary wing aircraft such as helicopters, gyrocopters, and tilt rotors and more particularly to logic and displays useful in a helicopter enhanced ground proximity warning system, or EGPWS.

Ground proximity warning systems, or GPWS, provide aural and visual warnings of conditions when the aircraft is in potentially hazardous proximity to terrain, and/or in a flight condition apparently inappropriate given the aircraft's position relative to terrain. Earlier generation ground proximity warning systems sensed dangerous approach to terrain by using a radar altimeter to sense height above the ground. The rate at which height above ground changes, is compared with a predefined envelope(s) to determine if a dangerous condition exists. Classic GPWS systems also contain additional alert functions called 'modes' that alert to other potentially hazardous conditions based on flight regime. Examples of GPWS devices are contained in U.S. Pat. Nos.: 3,715,718; 3,936,796; 3,958,218; 3,944,968; 3,947,808; 3,947,810; 3,934,221; 3,958,219; 3,925,751; 3,934,222; 4,060,793; 4,030,065; 4,215,334; and 4,319,218.

Later generation GPWS devices, called EGPWS devices or terrain awareness systems (TAWS), include a stored terrain database that compares the position of the aircraft in three dimensional space with the stored terrain information to identify potential conflicts. EGPWS devices may also include all the functionality and modes of the classic GPWS devices. Examples of EGPWS-type devices include U.S. Pat. Nos.: 4,646,244; 5,839,080; 5,414,631; 5,448,563; 5,661,486; 4,224,669; 6,088,634; 6,092,009; 6,122,570 and 6,138,060.

In certain EGPWS designs, the position of the terrain relative to the aircraft may be shown on a display in the cockpit. In some displays, the terrain is color-coded according to the degree of hazard. For example, green colored terrain usually depicts nonhazardous terrain below the aircraft. Yellow colored terrain usually depicts terrain that is in proximity to the aircraft and/or which may cause the ground proximity system to generate a precautionary alert. Red colored terrain usually depicts terrain at or above the aircraft altitude or for which the ground proximity warning system will issue a warning from which evasive action must be taken. U.S. Pat. Nos.: 5,839,080 and 6,138,060 describe some terrain cockpit displays. U.S. Pat. No. 5,936,522 describes a terrain display having vertical and plan views.

The above referenced systems have been primarily developed for fixed wing aircraft. Rotary wing aircraft and aircraft capable of hover present unique challenges for ground proximity alerting due to the different flight profiles flown and the unique capabilities of rotary wing aircraft. For example, unlike fixed wing aircraft, rotary wing aircraft can cease all forward motion while still remaining airborne. Rotary wing aircraft can also descend straight down from a hover to land on all sorts of terrain, and need not make a gradual descent and approach to land as in the case of fixed wing aircraft.

U.S. Pat. Nos. 5,781,126 titled "Ground Proximity Warning System and Methods for Rotary Wing Aircraft;" 5,666,110 titled "Helicopter Enhanced Descent After Take-off Warning for GPWS;" and 6,043,759 titled "Air Ground Logic System and Method for Rotary Wing Aircraft;" and co-pending application Ser. No. 08/844,116 titled: "Systems and Methods for Generating Altitude Callouts for Rotary Wing Aircraft," each address various issues associated with applying ground proximity warning technology to rotary wing aircraft and are each incorporated herein by reference. These patents are applicable to both conventional and enhanced ground proximity warning designs for use in helicopters, however, these patents address the particularities of modifying various of the "modes" for use in helicopters. Specifically, U.S. Pat. No. 5,781,126 includes a barometric altitude rate detector including a controller for adjusting this rate detector to account for downwash of the rotary wing. U.S. Pat. No. 5,666,110 discloses a descent after take-off protection envelope. U.S. Pat. No. 6,043,759 discloses a logic method and device for determining when the helicopter is in the airborne or ground state which assists with preventing nuisance alarms during helicopter autorotations. Ser. No. 08/844,116 discloses a device and method for generating altitude call outs during helicopter landing operations.

None of the above mentioned patents account for modifying the terrain look ahead logic or the associated terrain display of an EGPWS type device to account for the unique flying performance of helicopters and other rotary wing craft.

SUMMARY OF THE INVENTION

The present invention recognizes the problems in enhanced ground proximity alerting for rotary wing aircraft such as, for example, helicopters, gyrocopters and tilt rotors when in the rotor mode, hereinafter generically and interchangeably referred to as "helicopter(s)" or "rotary wing aircraft". In particular, the present invention recognizes that certain categories of aircraft such as rotary wing aircraft and airships are capable of executing an avoidance maneuver by coming to a stop in a hover. The present invention further recognizes that the terrain threats as depicted on the display should preferably also be modified to reflect the unique, yet normal operating capabilities of such aircraft. In addition, the present invention recognizes the unique landing characteristics of rotary wing aircraft.

According to one aspect of the present invention, a helicopter EGPWS uses a look ahead distance to define terrain that is a threat to the aircraft. If terrain is located within the boundaries of the warning envelope, an alert is given to the pilot. In a preferred embodiment of the present invention, this look ahead distance is based upon the nominal distance required to halt forward momentum and enter a hover.

According to another aspect of the present invention, a helicopter EGPWS permits the helicopter to land at any location, including off-airport locations, without incurring nuisance alarms. In a preferred embodiment of the invention, the helicopter EGPWS uses groundspeed in conjunction with helicopter vertical speed to define a terrain floor below which a proximity warning will be given. In this manner, the helicopter executing a safe landing, for example, on a hillside will not incur an unwanted terrain proximity alert.

According to yet another aspect of the present invention, the present invention recognizes that a display color coded to alert pilots of fixed wing aircraft to potential hazards may result in displaying non-threatening terrain as a hazard to pilots of rotary wing aircraft. The EGPWS and EGPWS display of the present invention color codes terrain based upon flight regimes associated with modes of operation typical for rotary wing aircraft.

Further details and operation of the present invention will be described below with reference to the drawings.

BRIEF DESCRIPTION OF THE DRAWINGS

FIG. 3 diagrams six basic warning modes for a helicopter ground proximity warning system according to an embodiment of the present invention;

DETAILED DESCRIPTION OF THE PREFERRED EMBODIMENTS

System Overview

Figure 1A:
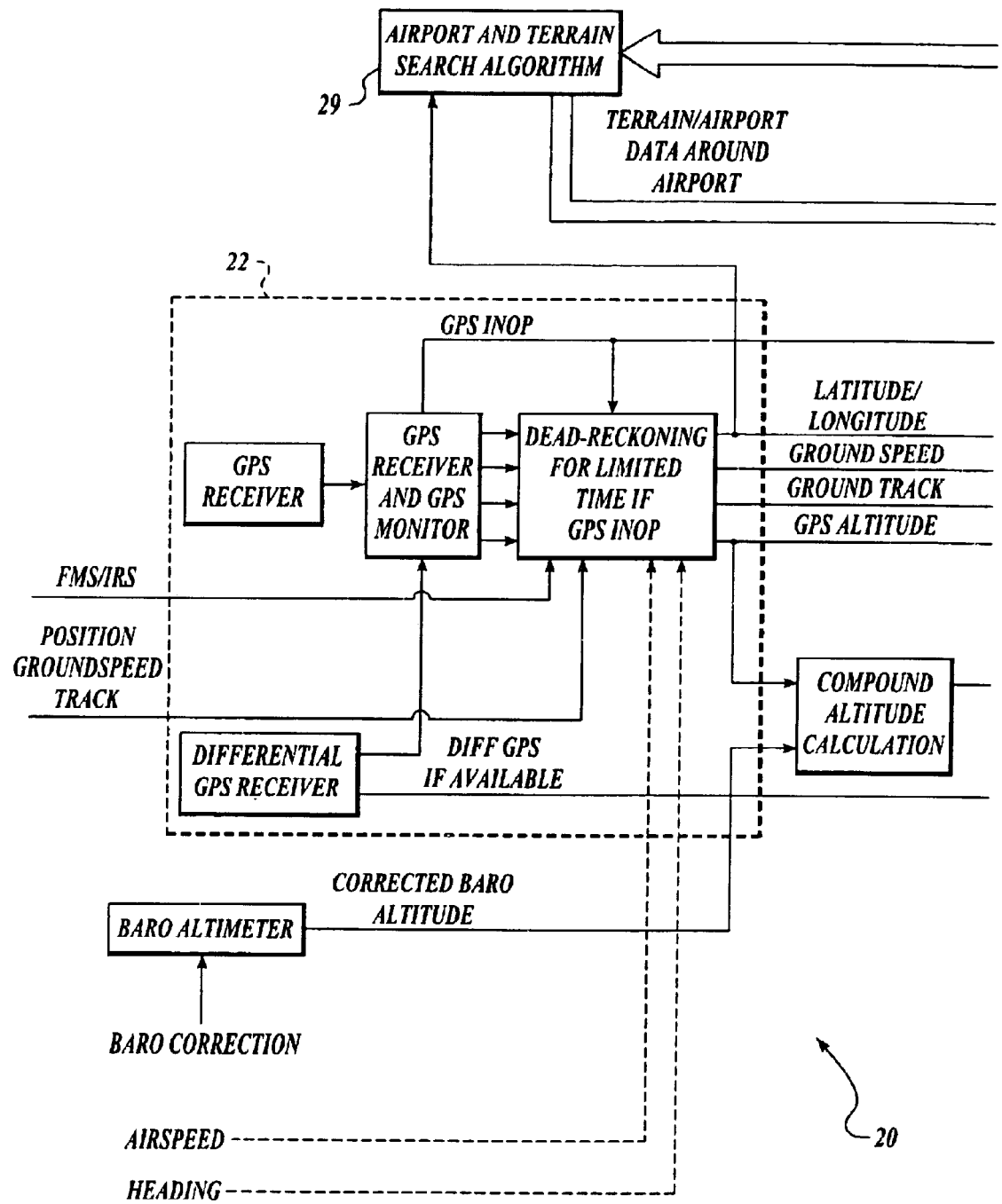
FIGS. 1A–1B are a top level block diagram of an EGPWS computer for use on helicopters according to an embodiment of the present invention.
Figure 1B:
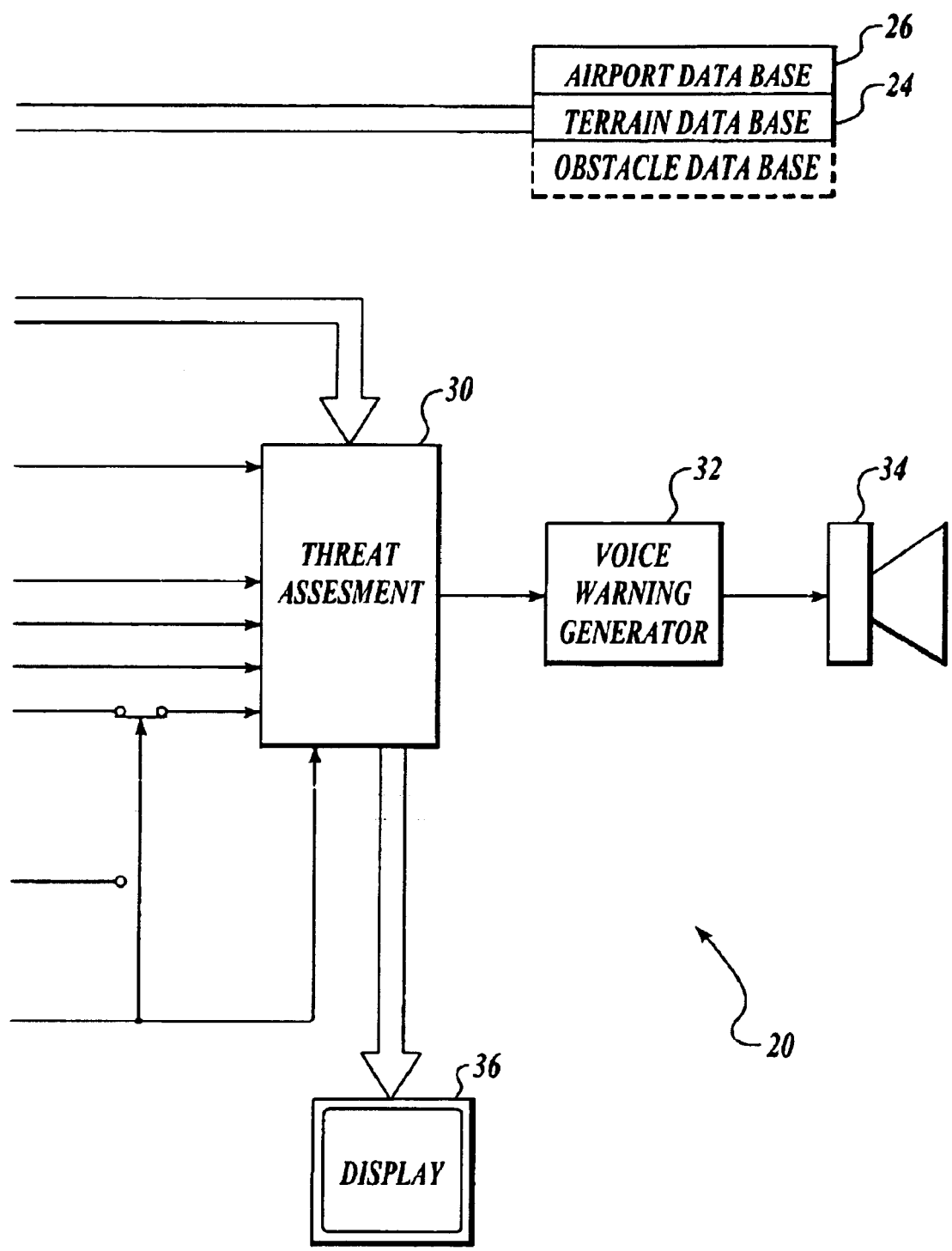

U.S. Pat. No. 5,839,080, incorporated herein by reference, describes an EGPWS device manufactured by Honeywell International Inc., and suitable for use with the present invention. Additional EGPWS features applicable to rotary wing aircraft are described in U.S. Pat. Nos. 6,138,060; 6,122,570; 6,092,009; 6,088,634; as well as in copending application Ser. Nos.: 09/099,822; 09/074,953; 09/103,349; 09/255,670 and 09/496,297, each of which is incorporated by reference. FIGS. 1A and 1B provide a top level description of such a system in block diagram form. The terrain awareness system 20 utilizes navigation information from a global positioning system 22 and/or a flight management system (FMS) and/or inertial navigation system. Navigation information may also be received from other aviation navigation systems such as, for example: DME/DME, VOR/DME, RNAV, and LORAN systems. System 20 further includes a terrain/obstacle database 24, and/or an airport database 26 (collectively "terrain") and a corrected barometric altitude signal which may be obtained from an air data computer or barometric altimeter 28. In a preferred embodiment of the invention, altimetry information can be obtained in accordance with the techniques described in co-pending application Ser. No. 09/255,670 titled "Method and Apparatus for Determining Altitude" and/or co-pending application No. titled, "Device, Method and Computer Program Product for Altimetry System" filed Feb. 2, 2001.

The latitude and longitude of the current aircraft position are applied to an airport and terrain search algorithm, indicated by a block 29 which includes location search logic for determining the terrain data, as well as the airport data surrounding the aircraft. Example search logic is described in U.S. Pat. Nos. 4,675,823 and 4,914,436 assigned to the assignee of the present invention and incorporated herein by reference as well as in U.S. Pat. No. 5,839,080. The navigational position data, along with the terrain and airport data are supplied to a threat assessment function 30 which provides both terrain advisory and terrain warning signals based upon the position and flight path vector of the aircraft. Function 30 may provide both aural and/or visual warnings when a hazardous condition is believed to exist. Aural warnings may be provided by voice generator 32 and speaker 34. Visual warnings may be provided by a moving map or display 36. Display 36 may comprise any cockpit display, such as, for example, a weather radar display, a TCAS display, an Electronic Flight Instrument System (EFIS) display or a Honeywell UDI display. The terrain and obstacles depicted on display 36 may be colored according to the degree of threat in a manner to be described in greater detail below.

Figure 2:
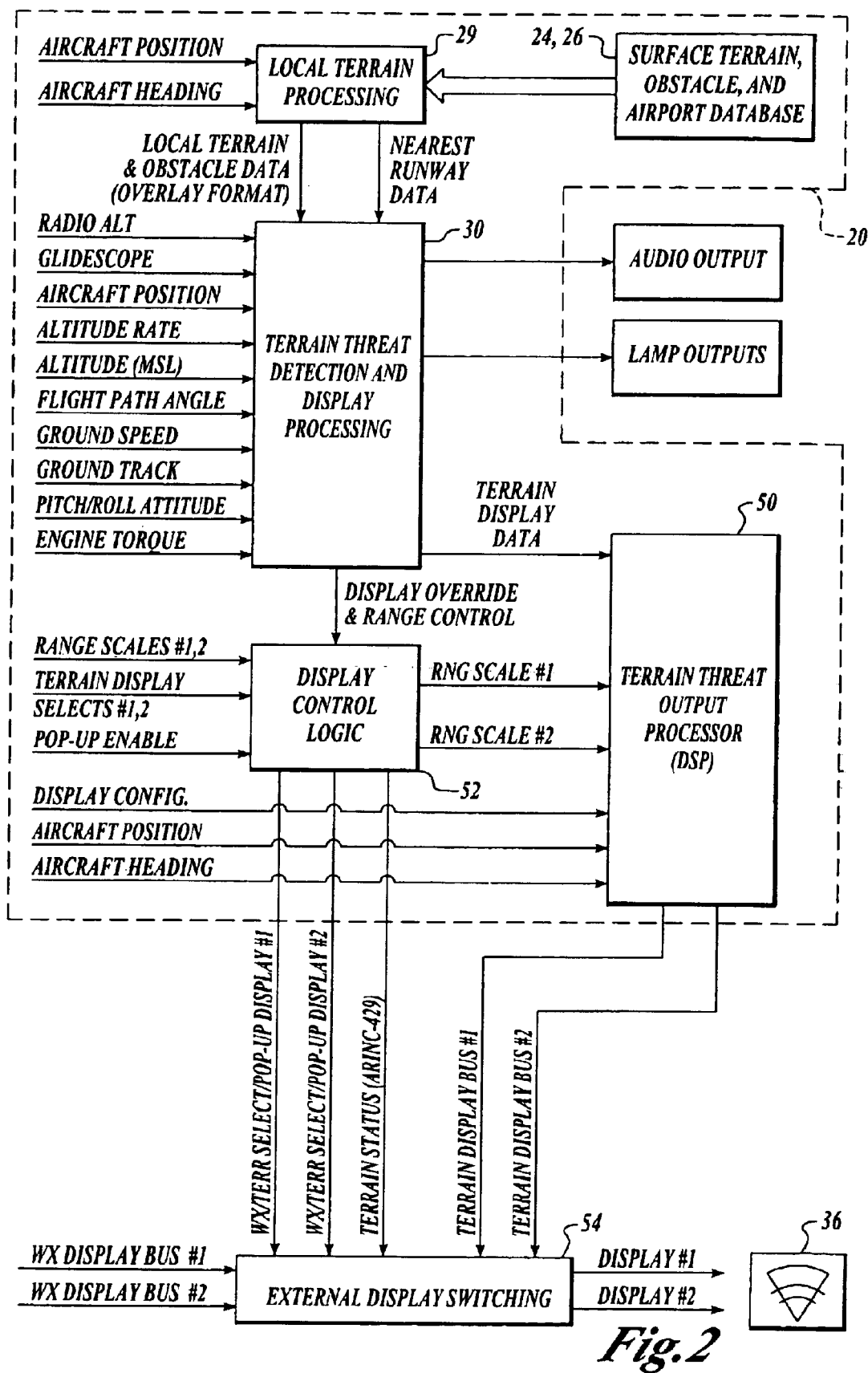
FIG. 2 is a functional block diagram of an EGPWS computer according to an embodiment of the present invention.

FIG. 2 contains a more detailed functional block diagram of EGPWS computer 20 of the present invention. The EGPWS computer 20 as shown in FIGS. 1A–1B and in FIG. 2, may be implemented as executable code, an analog or digital electronic circuit, on a PCMCIA card, as programmable logic and/or as a general purpose processor. In a preferred embodiment of the invention, warning computer 20 is implemented as a line replaceable unit (LRU) containing a microprocessor. Database 24 is included on a PCMCIA card which may be loaded into the LRU and also used to provide periodic system upgrades.

In the embodiment of FIG. 2, local terrain processing function 29 receives as input the aircraft position and heading data and retrieves from database(s) 24 and 26, the terrain, obstacle and/or runway data in the vicinity of the aircraft. As described in U.S. Pat. No. 5,839,080, herein incorporated by reference for all purposes, terrain processing function 29 extracts and formats the local topographical data and terrain features to create a set of elevation matrix overlays that are positioned with respect to the current aircraft location. Each matrix element includes as data, the highest terrain altitude with respect to mean sea level contained within that element's area. Terrain processing function 29 optionally retrieves any obstacle data associated with the matrix elements as well as retrieving data for the runway nearest the current location of the aircraft. Runway data includes the runway endpoint locations and may be processed to include nearest runway center position, nearest runway threshold position, and nearest runway altitude.

The threat detection and terrain display processing function 30 receives as input the terrain data as processed by function 29 as well as the current aircraft position, altitude, attitude, speed and track information. When a potential hazard to the aircraft exists, function 30 controls the output of an alert which may include an aural warning, the illumination of a lamp, and/or depiction of the threat on display 36. Results of the threat detection process are combined with background terrain data/obstacle matrix data and data for the nearest runway and formatted into a matching set of display matrix overlays for display on display 36. A display output processor 50 receives the set of display matrix overlays from function 30 as well as the aircraft position and heading information to drive display 36. A display control logic 52 controls the display range and the activation of display of terrain data on the chosen display. In the embodiment of FIG. 2, display control logic 52 controls an external switch 54 that may be used to switch a weather radar display from display of weather to display of terrain.

FIG. 3 diagrams the six basic warning modes for the helicopter ground proximity warning system of the present invention. The various modes provide aural and visual alerts and warnings including warnings for: unsafe proximity to terrain, deviation below ILS glide slope, excessive bank angle, onset of severe wind shear, altitude awareness. Mode one, for example, provides pilots with alert/warnings for high descent rates into terrain. In this mode, a warning device compares the altitude above ground of the aircraft with the descent rate, preferably barometric descent rate, and issues a warning if the descent rate is excessive for the altitude at which the aircraft is flying. A more complete description of an exemplary warning device for indicating excessive descent rate can be found in U.S. Pat. No. 4,551,723, the complete disclosure of which has previously been incorporated herein by reference. Mode two provides warnings for excessive closure rates to terrain with respect to altitude (AGL), phase of flight and speed. Mode three provides warnings for significant altitude loss after takeoff or low altitude go around as described in U.S. Pat. No. 5,666,110. A complete description of the system can be found in U.S. Pat. No. 4,818,992, the complete disclosure of which has previously been incorporated herein by reference.

Mode four provides alerts and warnings for insufficient terrain clearance with respect to phase of flight and speed. Mode five provides glide slope alerts when the airplane is below 1,000 ft. AGL with the gear down and the glide slope deviation exceeds a threshold number of dots below the ILS glide slope. Mode six provides callouts for descent through predefined altitudes (AGL). In particular, mode six is utilized during autorotation when the aircraft has lost all or partial engine power. Each of the various warning modes provides at least an aural alert for a particular hazard as shown.

According to another embodiment of the invention, Mode 6 includes a capability for alerting the pilot of a helicopter of a possible tail strike condition. Details of the Mode 6 tail strike alert are contained in copending U.S. application Ser. No. 09/865,365 filed the same day herewith and incorporated herein by reference.

Terrain Caution and Warning Envelopes

In addition to the warning modes depicted in FIG. 3, and as described above in connection with FIGS. 1A–1B and FIG. 2, the EGPWS device of the present invention utilizes a plurality of caution and alert envelopes to warn of potential terrain hazards. If the aircraft penetrates the caution envelope boundary, the aural message "*Caution Terrain, Caution Terrain* " is generated, and alert discretes are provided for activation of visual annunciators. Terrain located within the caution envelope is shown in solid yellow color on display 36. If terrain proximate the aircraft penetrates the warning envelope boundary, the aural message "Warning Terrain" is generated, and alert discretes are provided for activation of visual annunciators. Terrain located within the warning envelope is shown in solid red color on display 36.

Figure 4:
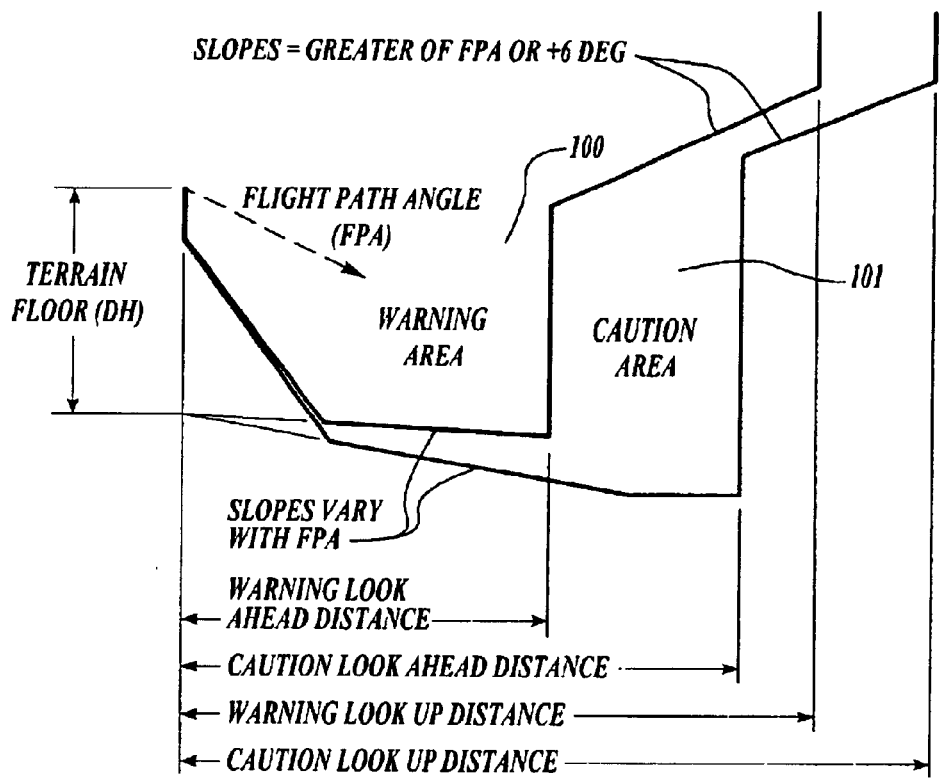
FIG. 4 is a side view of terrain caution and warning envelopes according to an embodiment of the present invention.
Figure 5:
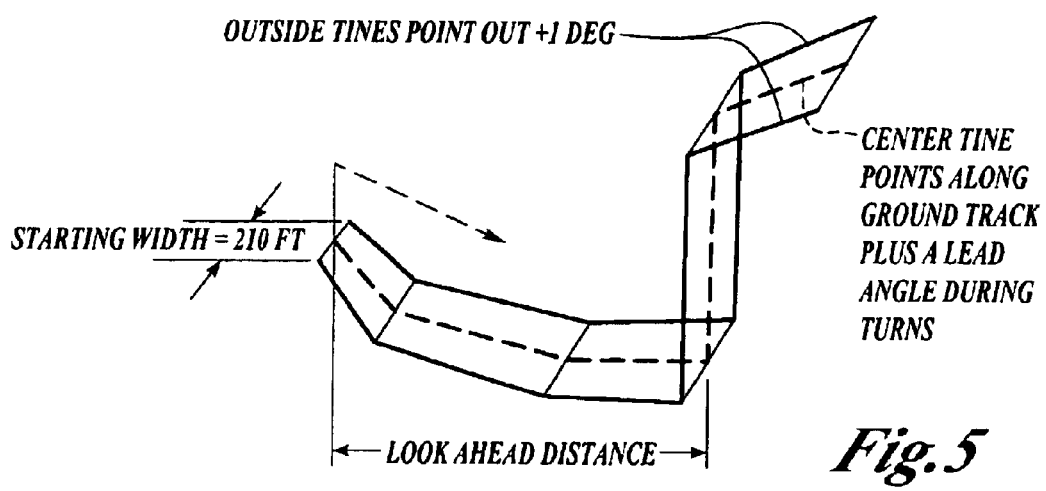
FIG. 5 is a perspective view of terrain caution and warning envelopes according to an embodiment of the present invention.

The caution and warning envelopes are obtained using a terrain floor and a "look ahead" distance to define a volume which is calculated as a function of groundspeed and flight path angle. FIG. 4 shows a simplified side view of caution and warning envelopes 100 and 101 according to an embodiment of the present invention. FIG. 5 shows a perspective view of the caution and warning envelopes.

According to a preferred embodiment of the invention, terrain and caution alerting can be provided for both a "normal" mode and a "low level" mode of operation. The low level mode is applicable to low altitude flight in daylight VFR conditions. Use of the low level caution and warning logic is selectable by the pilot and reduces nuisance warnings by accounting for the unique low altitude operations of rotary wing aircraft. The normal mode comprises the default condition and is used for cruise, night time and instrument flight rules operations. The pilot may select between the caution and warning envelopes of the normal mode and the alert envelopes and/or display of the low level mode via a cockpit switch or display touch screen.

The look ahead distance of the caution and warning terrain protection envelopes is taken in a direction along the groundtrack of the aircraft. To reduce nuisance warnings, the look ahead distance may have a maximum value. Otherwise, potentially threatening terrain along the current flight path of the aircraft relatively far from the current position could produce nuisance warnings. Two different look ahead distances (LAD) are utilized. The first LAD is used for a terrain caution signal. A second LAD is used for terrain warning signals which require immediate evasive action.

Figure 6:
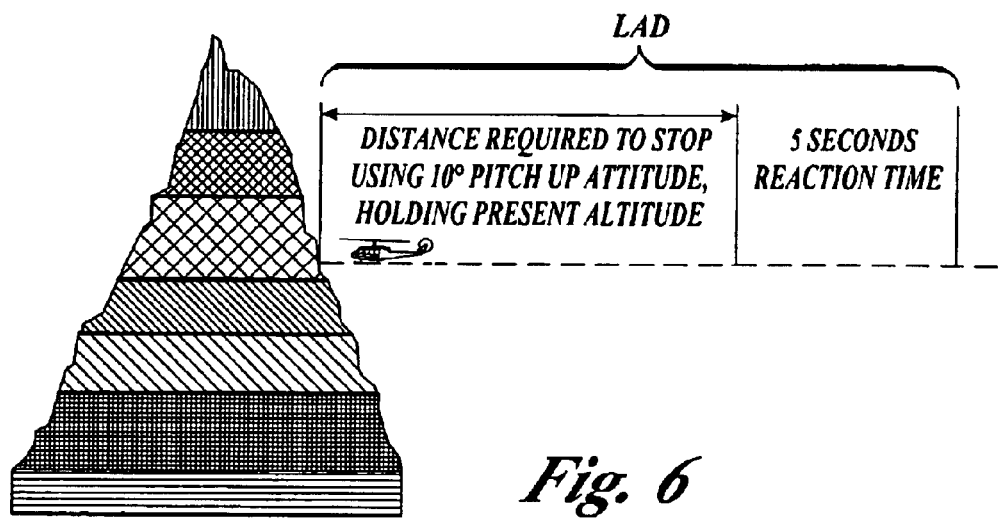
FIG. 6 illustrates a look ahead distance for use in determining terrain caution and warning envelopes for aircraft capable of hover according to an embodiment of the present invention.

In aircraft not capable of hover, and in the normal mode, the LAD for a terrain advisory condition is considered first in determining the LAD because it is assumed that the pilot could make a turn at any time at a turning radius R. For a fixed wing aircraft as fully described in U.S. Pat. No. 5,839,080, the total look ahead time is equal to the sum of the look ahead time $T_1$ of a single turn of radius R; the look ahead time $T_2$ for terrain clearance at the top of the turn plus a predetermined reaction time $T_3$. In a helicopter, or other aircraft capable of hover using the low level mode, however, the look ahead distance can instead be based on the distance required to bring the aircraft to a stop or hover plus the distance covered during a nominal reaction time. In the case of a helicopter, the distance required to transition from cruise to hover using, for example, a 10° pitch up at constant altitude may be used. FIG. 6 diagrams the look ahead distance for the helicopter according to the present invention.

The LAD can be expressed as:

$$\text{LAD} = \text{Transition Distance to Hover} + \text{Reaction Time Distance} \quad \text{Eq. (1)}$$

Assuming the aircraft comes to a stop, the total distance covered when transitioning to hover is governed by the standard equation:

$$s = \frac{1}{2}at^2 \quad \text{Eq. (2)}$$

where:
s=distance to stop
a=deceleration
t=time.
The average velocity during the deceleration interval t is:

$$\overline{V} = \frac{GS}{2}, \quad \text{Eq. (3)}$$

where GS =groundspeed.
The distance covered can then be written as:

$$s = \frac{GS}{2}t \quad \text{Eq. (4)}$$

Substituting Eq. (4) back into Eq. (2); and solving for time, t, yields:

$$t = \frac{GS}{a} \quad \text{Eq. (5)}$$

Eq. 5 can then be used to develop an expression for stopping distance as given in Eq. (6) below:

$$s = \frac{(GS)^2}{2a} \quad \text{Eq. (6)}$$

For a nominal pitch up of 10° the following equation can be used to solve for a:

$$ma = mg (\tan 10°) \quad \text{Eq. (7)}$$

or, $$a = g\tan 10° = \left(68682\frac{\text{nm}}{\text{hr}^2}\right)(0.18) = 12363\frac{\text{nm}}{\text{hr}^2} \quad \text{Eq. (8)}$$

The above derivations have the advantage of making the calculation of LAD independent of the aircraft mass and hence independent of aircraft type.

For a predetermined reaction time $T_3$, for example, 10 seconds, the look ahead distance LAD in nautical miles for a terrain advisory signal can be determined simply by multiplying the ground speed of the aircraft (V) by the reaction time $T_3$ and adding this value to the stopping distance as shown in Eq. (9).

$$\text{LAD} = \left(\frac{(GS)^2}{2a}\right) + GS(T_3) \quad \text{Eq. (9)}$$

Table I lists the resulting LAD for a 10° constant altitude transition to hover and a reaction time of 5 seconds:

TABLE I

LAD For 10° Pitch, Constant Altitude Hover And 5 Second Reaction Time

| GROUNDSPEED (kts) | LAD (nm) |
|---|---|
| 80 | 0.55 |
| 100 | 0.78 |
| 120 | 1.06 |

The LAD may optionally be additionally bounded by an upper limit and a lower limit. The lower limit may be a configurable amount, for example; either 0.35, 1 or 1 ½ nautical miles at relatively low speeds e.g. speeds less than 40 knots, for example, and 4 nautical miles at higher speeds, for example, greater than 250 knots. The LAD may also be limited to a fixed amount regardless of the speed when the distance to the nearest runway is less than a predetermined amount, for example, 2 nautical miles, except when the aircraft altitude is greater than 500 feet, relative to the runway.

In a preferred embodiment of the invention, the LAD for a terrain warning signal is taken as ½ the terrain caution signal LAD. Optionally, and as described more fully in U.S. Pat. No. 5,839,080, the terrain warning LAD may be given by equation (10) below.

$$\text{LAD} = k_1 * \text{LAD (terrain caution)}, k_2 * \text{LAD (terrain warning)}, K_3 \text{LAD (terrain look-up advisory)} \quad \text{Eq. (10)}$$

where $k_1$=1.5, except when the LAD is limited at its lower limit, in which case $k_1$=1, $k_3$=1 and where $k_2$=0.5, $k_3$=2.

Figure 7:
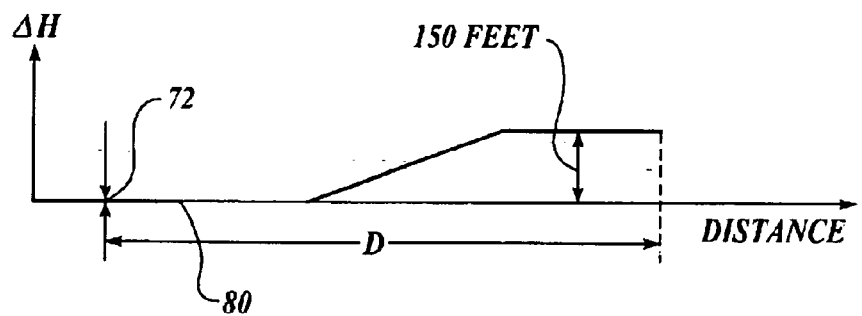
FIG. 7 graphs a function useful for obtaining terrain floor ΔH for on-airport landings according to an embodiment of the present invention.

As shown in FIGS. 4 and 5, the caution and advisory envelopes are additionally defined by a terrain floor boundary. In a fixed wing aircraft, the terrain floor relates to a distance ΔH below the aircraft and is proportional to the distance to the closest runway to prevent nuisance warnings when the aircraft is taking off and landing, while providing adequate protection in other modes of operation. FIG. 7 illustrates the terrain floor ΔH used for airport landings. The terrain floor boundary below the aircraft is essentially based upon providing 100 feet clearance per nautical mile from the runway as identified by runway centerpoint 72 and endpoint 80, limited to 150 feet. In a preferred embodiment of the invention, distance D from runway centerpoint 72 is equal to 12 nm.

Figure 8:
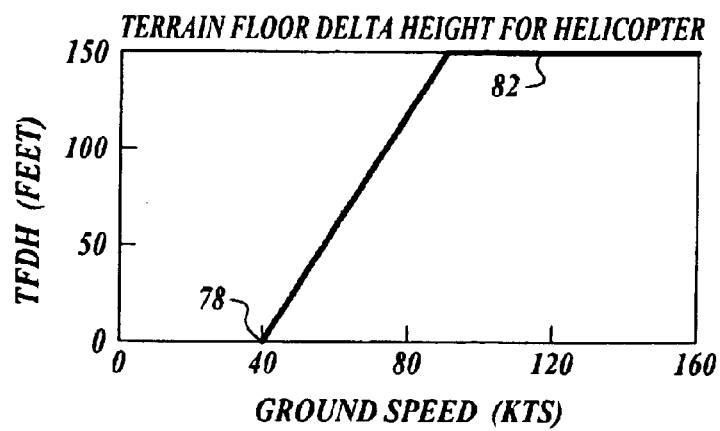
FIG. 8 graphs a function useful for obtaining terrain floor ΔH for helicopters according to an embodiment of the present invention.

However, in aircraft capable of landing safely off-airport, such as a helicopter, nuisance alarms will occur when the helicopter lands on, for example, a hillside or other safe but off-airport/helipad location. For this reason, the present invention utilizes the terrain floor ΔH of FIG. 8. In FIG. 8, the horizontal axis represents the groundspeed while the vertical axis represents the ΔH terrain floor boundary beneath the aircraft. The terrain floor ΔH boundary beneath the aircraft is limited such that the segment commencing at point 78 beings at 0 feet and the segment 82 never goes above a predetermined maximum, for example, 150 feet. The groundspeed corresponding to point 78 is preferably the airspeed corresponding to the landing or touchdown speed in zero wind conditions. Therefore, as illustrated in FIG. 8, so long as the pilot continuously slows the aircraft while descending, no terrain alert will be given by the present invention. Such conditions are indicative of an approach to land and are not likely to be indicative of a controlled flight into terrain accident.

For helicopters with retractable landing gear, the terrain floor delta height function of FIG. 8 can be additionally coupled to logic that detects when the gear is deployed.

If the gear is not deployed, the curve of FIG. 8 can be disabled and the ΔH curve of FIG. 7 utilized. The Mode 4 "Too Low Gear" warning will also sound.

Figure 9:
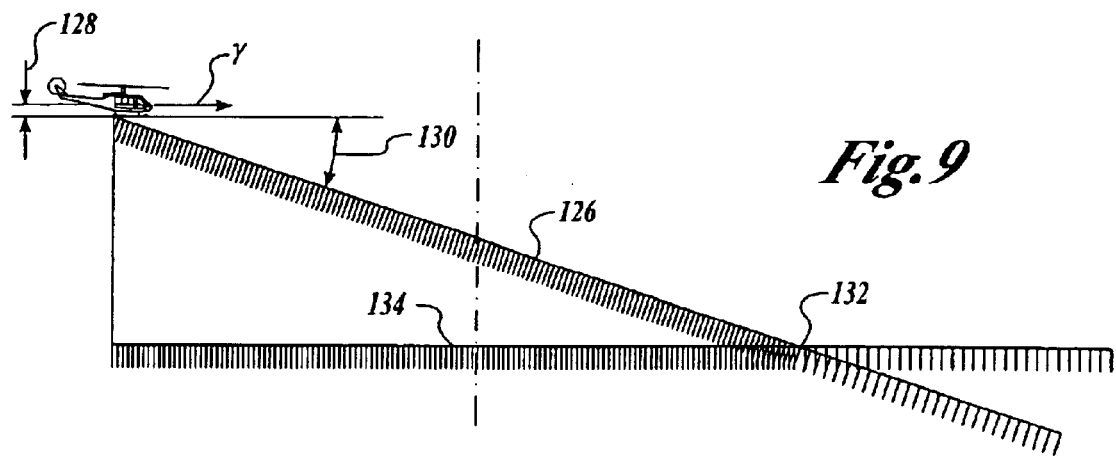
FIG. 9 is a graphical illustration of a cut-off angle correction boundary for a level flight condition according to an embodiment of the present invention.
Figure 10:
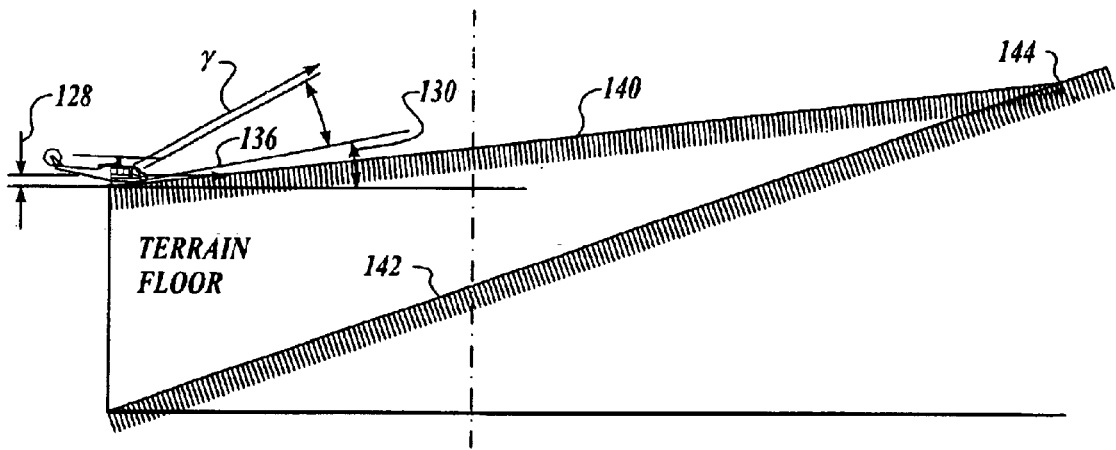
FIG. 10 is a graphical illustration of a cut-off angle correction boundary for a condition where the flight path angle of the aircraft is greater than a predefined reference or datum according to an embodiment of the present invention.
Figure 11:
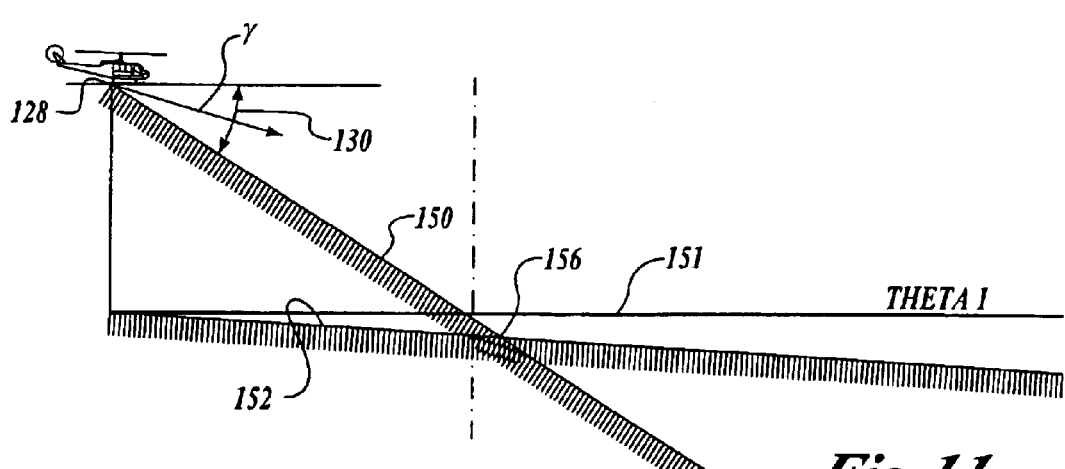
FIG. 11 is similar to FIG. 9 but for a condition where the flight path angle of the aircraft is less than a predefined reference plane or datum and also illustrates a BETA sink rate enhancement boundary according to an embodiment of the present invention.

In order to avoid spurious warnings when the aircraft over flies a ridge at relatively low altitudes, the terrain advisory and warning boundaries may additionally include cut-off boundaries, for example, as illustrated in FIGS. 9, 10 and 11. Without the cut-off boundaries, warnings would be given, although the terrain is virtually below the aircraft and no terrain is visible ahead. In FIG. 9, the cut-off boundary 126 begins at a predetermined cut-off offset 128 below the aircraft and extends in a direction in front of the aircraft at a predetermined envelope cut-off angle 130. The envelope cut-off angle 130 is equal to the flight path angle y plus a configurable predetermined cut-off angle, described and illustrated as 6°. For level flight as shown in FIG. 9, the cut-off boundary 126 extends from the cut-off offset 128 in the direction of the envelope cut-off angle 130 toward the front of the aircraft to a point 132 where it intersects a terrain caution boundary or terrain warning boundary, identified with the reference numeral 134. For level flight, as shown in FIG. 9, the flight path angle y is zero. Thus, the cut-off boundary 126 illustrated in FIG. 9 will extend from the cut-off offset 128 along an angle equal to the cut-off angle.

The cut-off boundary 126 extends from the cut-off offset 129 to the point 132 where it intersects the terrain caution boundary 134. The warning boundary is then selected to be the highest of the terrain caution boundary 134 and the envelope cut-off boundary 126. Thus, for the example illustrated in FIG. 9, the terrain caution boundary would include the cut-off boundary 126 up to the point 132, where the envelope cut-off boundary 124 intersects the warning envelope 126. From the point 132 forward, the normal terrain caution boundary 134, corresponding, for example, to a THETA1 slope is utilized. Thus, if either a terrain caution or terrain warning boundary is below the cut-off boundary 126, the cut-off boundary 126 becomes the new boundary for the caution or warning signal.

The cut-off boundary may additionally include a cut-off altitude. The cut-off altitude is an altitude relative to the nearest runway elevation; set at, for example, 500 feet. Altitudes below the cut-off altitude are ignored by the terrain advisory and terrain warning computations. An advantage to using a cut-off altitude is that nuisance warnings on final approach, due to altitude errors, terrain database resolution and accuracy errors are minimized.

However, the use of a cut-off altitude during certain conditions, such as an approach to an airport on a bluff (i.e. Paine Field) at a relatively low altitude or even at an altitude below the airport altitude, may compromise system performance. More particularly, during such conditions, the use of a cut-off altitude may prevent a terrain warning from being generated because the threatening terrain may be below the cut-off altitude. In order to account for such situations and for the ability of helicopter type aircraft to land safely off the airport, the system selects the lower of two cut-off altitudes; a nearest runway cut-off altitude (NRCA) and a cut-off altitude relative to aircraft (CARA). The NRCA is a fixed cut-off altitude, relative to the nearest runway. The CARA is an altitude below the instantaneous aircraft altitude (ACA) by an amount essentially equivalent the ΔH terrain floor boundary of FIG. 7 or 8, whichever is smaller.

Equations (11) and (12) below set forth the NRCA and CARA. As mentioned above, the absolute cut-off altitude (ACOA) is the lower of the NRCA and CARA as set forth in equation (13).

$$\text{NRCA} = \text{COH} + \text{RE}, \quad \text{Eq. (11)}$$

where COH relates to the cut-off height and is a fixed configurable value, initially set between 400 feet and 500 feet; and RE equals the runway elevation.

$$\text{CARA} = \text{ACA} - \Delta\text{H} - \text{DHO}, \quad \text{Eq. (12)}$$

where ACA is the instantaneous aircraft altitude; ΔH is the smaller of the terrain floor of FIG. 7 or 8 and DHO is a configurable bias, set to, for example, 50 feet.

$$\text{ACOA} = \text{lower of CARA, NRCA}, \quad \text{Eq. (13)}$$

For landings in the vicinity of an airport runway contained in the database, however, a point, DH1, exists for which the ACOA is forced to be equal to NRCA independent of the aircraft altitude. The point DH1 is related to COH, AΔand DHO such that on a nominal three (3) degree approach slope, CARA is equal to NRCA when the aircraft is at a distance equal to a distance DH1 from the airport, as illustrated in Table II below:

TABLE II

Relationship Between COH, DH1 and Runway Distance

| COH (feet) | DH1 (feet) | DISTANCE TO RUNWAY (n mile) |
|---|---|---|
| 300 | 50 | 1 |
| 400 | 100 | 1.5 |
| 500 | 150 | 2 |

The point DH1 forces the cut-off altitude (COH) above the runway whenever the aircraft is close to the runway to ensure robustness against nuisance warnings caused by altitude errors and terrain database resolution margins to disable the terrain caution and warning indications when the aircraft is within the airport perimeter. There are trade-offs between nuisance warnings and legitimate warnings. In particular, the lower COH, the closer the caution and warning indications are given, making the system more nuisance prone. As indicated above, for a COH of 400, terrain caution and warning indications are effectively disabled when the aircraft is closer than 1.5 nm from an airport runway.

Figure 12:
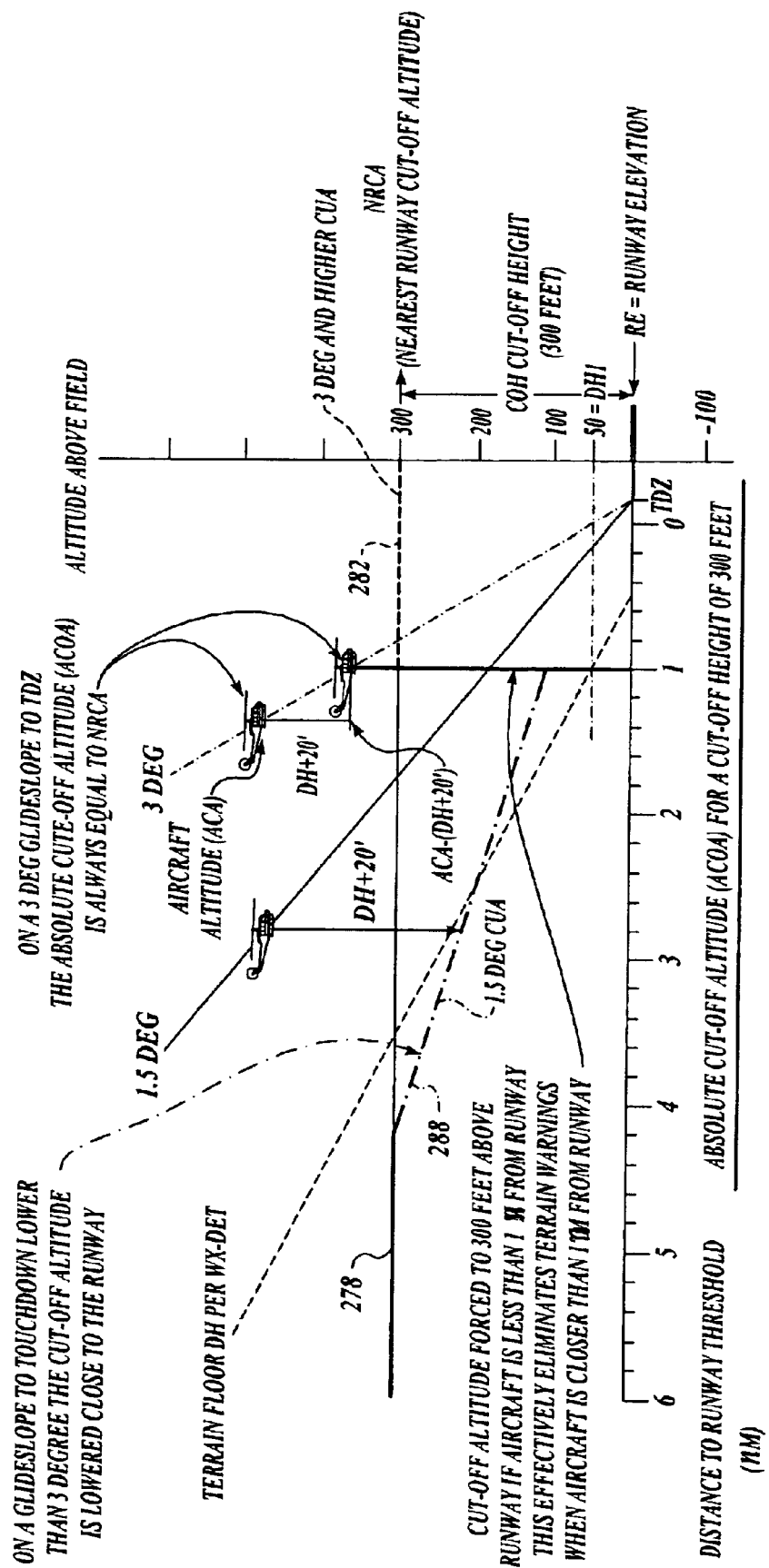
FIG. 12 is a graphical illustration of a cut-off altitude boundary according to an embodiment of the present invention.

FIG. 12 illustrates the operation of the alternative cut-off altitude boundaries. In particular, FIG. 12 illustrates a condition when the COH is set to 300 feet with DH1 equal to 50 feet. The cut-off altitude for an area from the runway, for example, greater than 4 nautical miles, is 300 feet, as indicated by the segment 278 when the glide slope angle is less than a predetermined angle, for example, 3°. As the aircraft gets closer to the runway, the COH is lowered, as illustrated by the segment 288, until the aircraft is within one (1) nautical mile of the runway, at which point the COH is forced to be 300 feet, which effectively disables any terrain caution and warning indications when the aircraft is closer than one (1) nautical mile from the runway, as represented by the segment 282. During a condition when the aircraft is on, for example, a 3° glide slope angle to the database runway, the ACOA is forced to be the NRCA. The NRCA is illustrated by the segment 282 of FIG. 12.

Figure 13:
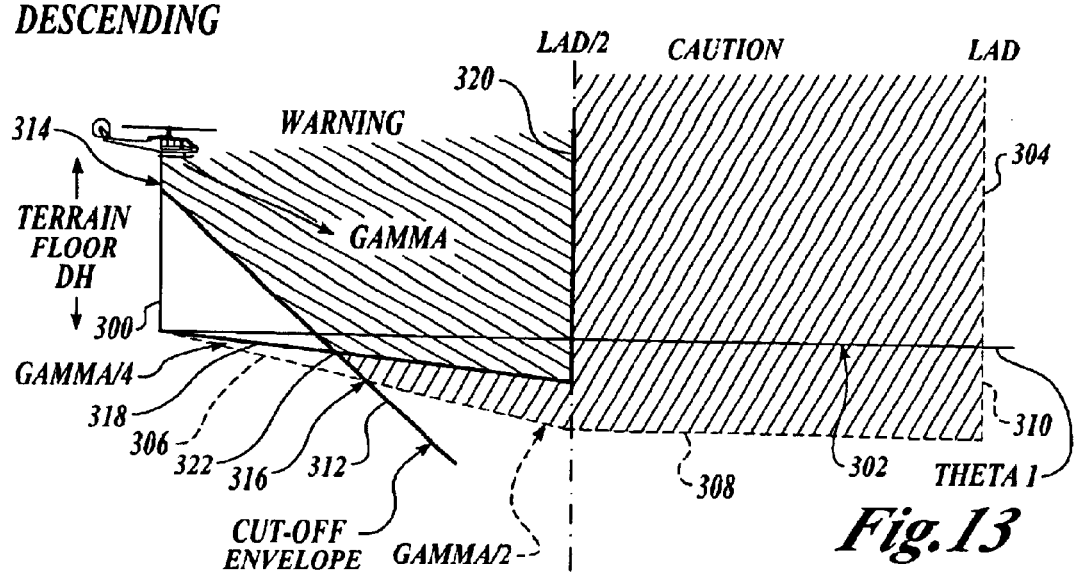
FIG. 13 illustrates a terrain caution and warning envelopes for a condition where the aircraft is descending according to an embodiment of the present invention.
Figure 14:
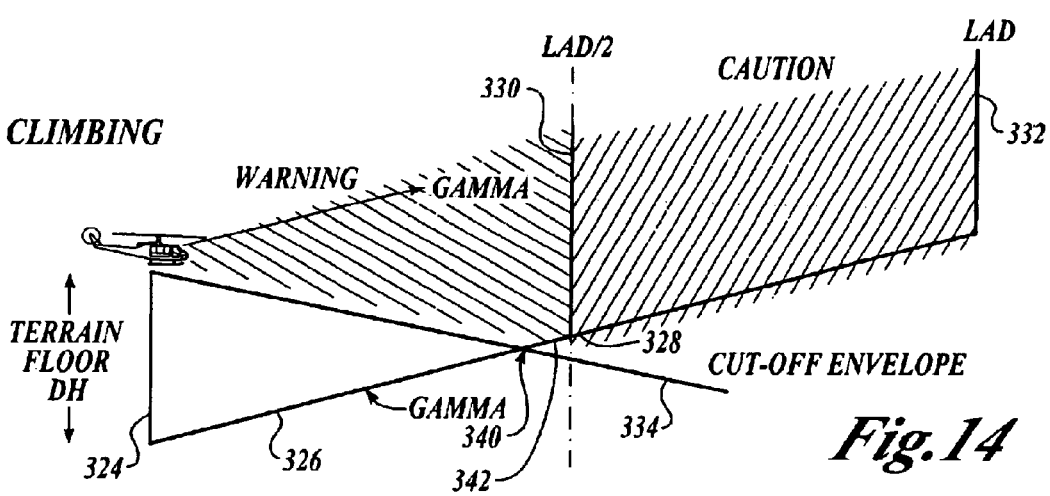
FIG. 14 illustrates a terrain caution and warning envelopes for a condition where the aircraft is climbing according to an embodiment of the present invention.
Figure 15:
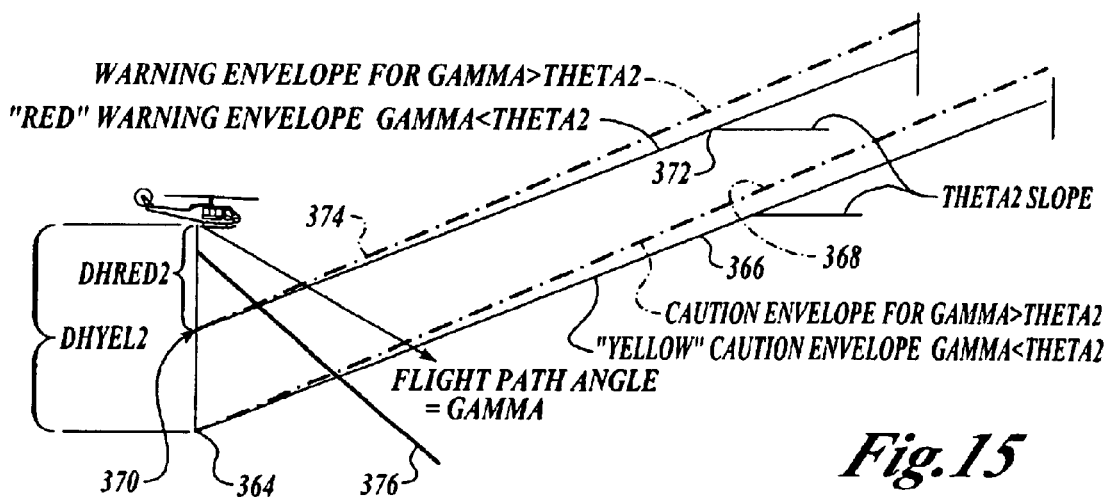
FIG. 15 illustrates a look up caution and warning envelopes for a condition for detecting precipitous terrain ahead of the aircraft according to an embodiment of the present invention.

The resulting terrain threat envelopes are illustrated in FIGS. 13–15. The terrain caution and warning envelopes may be thought of as including two parts: a look-ahead/look-down boundary for detecting terrain ahead or below the aircraft as shown in FIGS. 13 and 14; and a look-up boundary for detecting precipitous high terrain ahead of the aircraft which may be difficult to clear as shown in FIG. 15.

In FIG. 13, caution and warning envelopes are illustrated for a condition when the aircraft is descending (i.e. $\gamma<0$). During such a condition, the first segment of the terrain caution envelope, identified with the reference numeral 300, corresponds to the $\Delta H$ terrain floor boundary. To determine the bottom segment 302 of the terrain caution envelope, the flight path angle $\gamma$ is compared with a configurable datum, THETA1, for example 0°. During descent conditions, the flight path angle $\gamma$ will thus be less than THETA1. Thus, the look-ahead/look-down terrain advisory boundary segment will extend from the $\Delta H$ terrain floor boundary segment 300 along the angle THETA1 to the look-ahead distance for a terrain advisory (LAD). The final segment 304 extends vertically upward from the segment 302 along the LAD.

The terrain caution boundary may also be modified by a BETA sink rate enhancement. In this embodiment, the BETA sink rate enhancement ensures that an advisory indication always precedes a warning indication when the aircraft descends into or on top of terrain. The BETA sink rate enhancement is determined as a function of the flight path angle $\gamma$ and two (2) configurable constants KBETA and GBIAS. The BETA sink rate enhancement BETA1 for a look-ahead/look-down terrain advisory is provided in equation (14) below for a condition when the aircraft is descending. The angle BETA1 is given by:

$$\text{BETA1} = \text{KBETA} * (\gamma - \text{GBIAS}), \qquad \text{Eq. (14)}$$

where GBIAS is a configurable constant, selected for example, to be zero (0) and KBETA is also a configurable constant selected, for example, to be 0.5. In the embodiment of FIG. 13, the BETA sink rate enhancement BETA1 for the look-ahead/look-down terrain advisory boundary provides an advisory warning at a distance of ½ LAD. The BETA sink rate enhancement BETA1 results in a segment 306 which extends from the $\Delta H$ terrain floor segments 300 at an angle equal to $\gamma/2$ up to ½ of the LAD. Beyond ½ LAD, a LAD, a segment 308 extends at the angle THETA1 to a distance equal to the LAD. A vertical segment 310 extends along the LAD to connect the segments 308 to the segment 304.

In FIG. 13, the cut-off boundary is identified with the reference numeral 312. The cut-off boundary 312 extends from a vertical distance 314 below the aircraft along a cut-off angle up to the point of intersection 316 with the terrain advisory boundary. For distances less than the intersection 316, the cut-off boundary 312 forms the terrain caution envelope boundary. For distances beyond the point of intersection 316, the boundaries 306 and 308 form the terrain caution boundaries.

The terrain warning boundary includes the segment 300 extending from the aircraft along the $\Delta H$ terrain floor. A bottom segment 318 connects to the segment 300 and extends along a BETA sink rate enhancement angle BETA2, where angle BETA2 is given by the equation:

$$\text{BETA2} = \text{KBETA2} * (\gamma - \text{GBIAS}), \qquad \text{Eq. (15)}$$

where GBIAS is a configurable constant selected, for example, to be 0 and KBETA2 is also a configurable constant selected, for example, to be 0.25. For such values of the constants KBETA2 and GBIAS, the BETA enhancement angle KBETA2 will be ¼*$\gamma$. Thus, the segment 318 extends from the segment 300 at an angle equal to ¼*$\gamma$ up to ½ the LAD. A vertical segment 320 extends along a distance equal to ½*LAD from the segment 318 to define the terrain warning boundary.

The terrain warning boundaries are also limited by the cut-off boundary 312. Thus, the cut-off boundary 312 forms the terrain warning boundary up to a point 322, where the cut-off boundary 312 intersects the lower terrain warning boundary 318. At distances beyond the point of intersection 322, the segment 318 forms the lower terrain warning boundary up to a distance equal to ½ of the LAD.

The terrain advisory and terrain warning boundaries for a condition when the aircraft is climbing (i.e. $\gamma>0$) is illustrated in FIG. 14. During such a condition, the BETA sink rate enhancement angles BETA1 and BETA2 are set to a configurable constant, for example, zero (0). The terrain advisory boundary during the climbing condition is formed by extending a vertical segment 324 from the aircraft for a distance below the aircraft equal to the $\Delta H$ terrain floor of FIG. 7 or 8, whichever is smaller. A segment 326 is extended from the segment 324 to the LAD at an angle equal to the flight path angle $\gamma$. At a point 328 where the segment 326 intersects a position equal to ½ of the LAD, a vertical segment 330 is extended up from the segment 326, forming a first vertical boundary for the terrain advisory condition. The line segment 326 from the point 328 to the LAD forms the lower terrain advisory boundary while a line segment 332 extending vertically upward from the line segment 326 along the LAD forms a second vertical boundary.

For the exemplary condition illustrated, a cut-off boundary 334 does not intersect the terrain caution boundaries. Thus, the terrain caution boundaries for the exemplary condition illustrated is formed by the segments 330 and 332 and that portion of the line segment 326 between the line segments 330 and 332.

The terrain warning boundaries for the climbing condition of FIG. 14 include the vertical segment 324 which extends from the aircraft to vertical distance equal to the $\Delta H$ terrain floor of FIG. 7 or 8, whichever is smaller, below the aircraft forming a first vertical boundary. For a condition when the aircraft is climbing, the line segment 326 extends from the segment 324 at the flight path angle $\gamma$ to form the lower terrain warning boundary. The vertical segment 330 at a distance equal to ½ of the LAD forms the second vertical terrain warning boundary.

The cut-off boundary 334 limits a portion of the terrain warning boundary. In particular, the cut-off boundary 334 forms the lower terrain warning boundary up to a point 340, where the cut-off boundary 334 intersects the line segment 326. Beyond the point 340, a portion 342 of the line segment 340 forms the balance of the lower terrain warning boundary up to a distance equal to ½ of the LAD.

A look-up terrain advisory and terrain warning boundaries are illustrated in FIG. 15 and are applicable for the condition where the aircraft is not slowing for an off-airport landing. As will be discussed in more detail below, the look-up terrain advisory and warning boundaries start at altitudes DHYEL2 and DHRED2, respectively, below the aircraft. These altitudes DHYEL2 and DHRED2 are modulated by the instantaneous sink rate (i.e. vertical speed, HDOT of the aircraft). The amount of modulation is equal to the estimated altitude loss for a pull-up maneuver, for example, at ¼ G (e.g 8 ft/sec²) at the present sink rate. The altitudes DHRED2 and DHYEL2 are dependent upon the altitude loss during a pull-up maneuver (ALPU) and the altitude loss due to reaction time (ALRT) as given by:

$$ALRT = HDOT * T_R,\qquad\text{Eq. (16)}$$

where HDOT equals the vertical acceleration of the aircraft in feet/sec. and $T_R$ equals the total reaction time of the pilot in seconds.

Assuming a pull-up maneuver is initiated at time $T_I$, the altitude loss due to the pull-up maneuver ALPU may be determined by integrating the vertical velocity HDOT with respect to time as set forth below.

$$HDOT(t) = \alpha * t + HDOT_0\qquad\text{Eq. (17)}$$

where "a" equals the pull-up acceleration and $HDOT_0$ is a constant.

Integrating both sides of equation (17) yields the altitude loss as a function of time H(t) as provided in equation (18) below.

$$H(t) = \frac{1}{2}at^2 + (HDOT_0)t\qquad\text{Eq. (18)}$$

Assuming a constant acceleration during the pull-up maneuver, the time t until vertical speed reaches zero is given by equation (19).

$$t = \frac{-HDOT_0}{a}\qquad\text{Eq. (19)}$$

Substituting equation (19) into equation (18) yields equation (20).

$$\frac{HDOT_0^2}{2a}\qquad\text{Eq. (20)}$$

Equation (20) thus represents the altitude loss during the pull-up maneuver.

Figure 16:
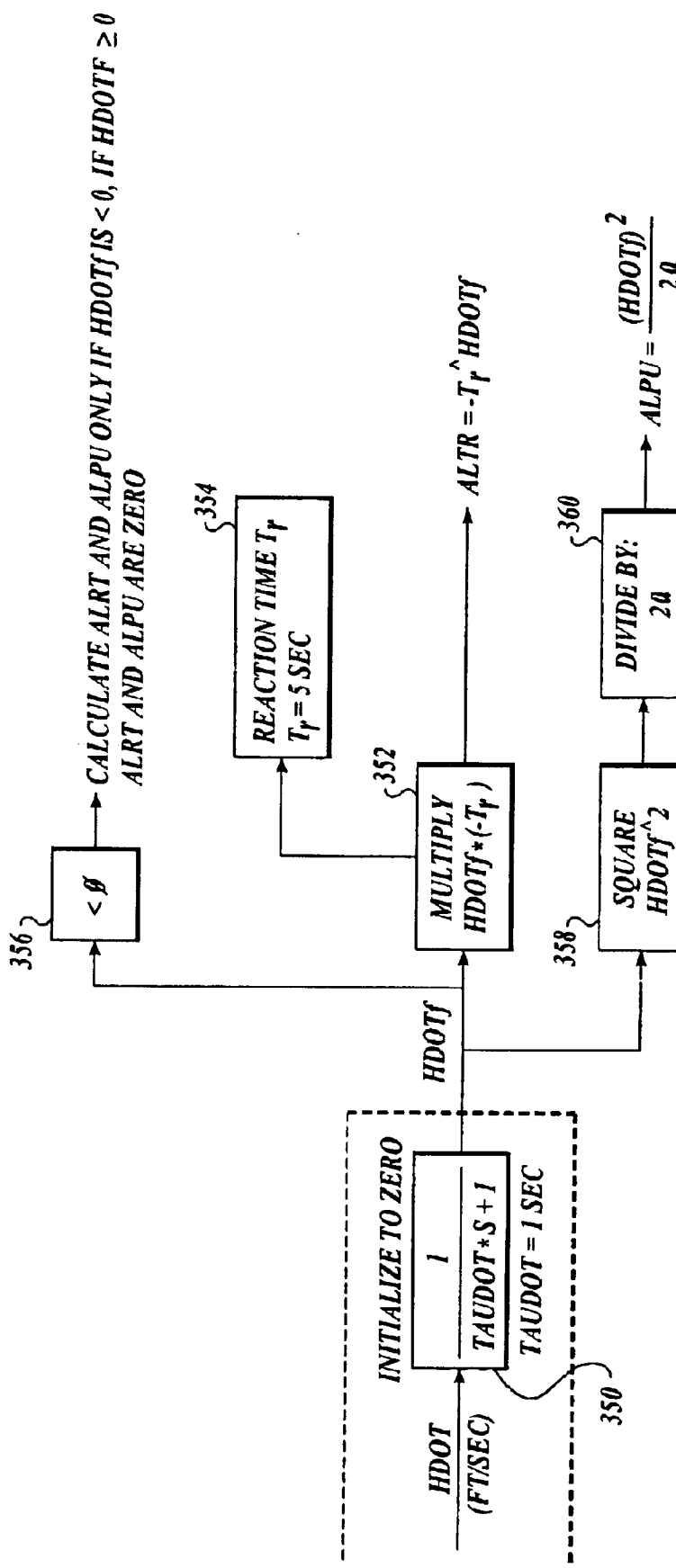
FIG. 16 is a functional block diagram for a system useful for asserting a signal representative of altitude loss due to pilot reaction time, ALPT, as well as altitude loss due to a pull up maneuver, ALPU, according to an embodiment of the present invention.

An exemplary block diagram for generating the signals ALRT and ALPU is illustrated in FIG. 16. In particular, a signal representative of the vertical velocity of the aircraft HDOT, available, for example, from a barometric altimeter rate circuit (not shown), is applied to a filter 350 in order to reduce nuisance warnings due to turbulence. The filter 350 may be selected with a transfer function of 1/(TAUDOT*S+1); where TAUDOT is equal to one second. The output of the filter 350 is a signal HDOTf, which represents the filtered instantaneous vertical speed; positive during climbing and negative during descent.

To obtain the altitude loss due to reaction time signal ALTR, the signal HDOTf is applied to a multiplier 352. Assuming a pilot reaction time $T_r$, for example, of 5 seconds, a constant 354 equal to 5 seconds is applied to another input of the multiplier 352. The output of the multiplier 352 represents the signal ALTR, which is positive when HDOTf is negative and set to zero if the signal HDOTf is positive, which represents a climbing condition. More particularly, the signal HDOTf is applied to a comparator 356 and compared with a reference value, for example, zero. If the comparator 356 indicates that the signal HDOTf is negative, the signal HDOTf is applied to the multiplier 352. During climbing conditions, the signal HDOTf will be positive. During such conditions, the comparator 356 will apply a zero to the multiplier 352.

The altitude loss due to the pull-up maneuver signal ALPU is developed by a square device 358, a divider 360 and a multiplier 362. The filtered instantaneous vertical speed signal HDOTf is applied to the square device 358. Assuming a constant acceleration during the pull-up maneuver, for example, equal to 8 feet/sec² (0.25 $_g$), a constant is applied to the multiplier 362 to generate the signal 2a. This signal, 2a, is applied to the divider 360 along with the output of the square device 350. The output of the divider 360 is a signal (HDOTf) 2/2a, which represents the altitude loss during a pull-up maneuver signal ALPU.

These signals ALRT and ALPU are used to modulate the distance below the aircraft where terrain advisory and terrain warning boundaries begin during a look-up mode of operation. More particularly, during such a mode of operation, the portion of the ΔH terrain floor segment of the terrain caution envelope contributed by DHYEL2 is modulated by the signals ALRT and ALPU while the ΔH terrain floor of the terrain warning boundary DHRED2 is modulated by the signal ALPU as indicated in equations (21) and (22), respectively.

$$DHYEL2 = \tfrac{3}{4} * \Delta H + ALRT + ALPU\qquad\text{Eq. (21)}$$

$$DHRED2 = \tfrac{1}{2} * \Delta + ALPU,\qquad\text{Eq. (22)}$$

where ΔH represents the terrain floor of FIG. 8? as discussed above.

Thus, in FIG. 15, the look-up terrain caution boundary begins at a point 364 below the aircraft; equal to DHYEL2. If the flight path angle γ is less than a configurable datum THETA2, a terrain advisory boundary 366 extends from the point 364 to the advisory LAD at an angle equal to THETA2. Should the flight path angle y be greater than THETA2, the lower advisory boundary, identified with the reference numeral 368, will extend from the point 364 at an angle equal to the flight path angle γ.

Similarly, the look-up terrain warning boundary begins at point 370 below the aircraft; equal to DHRED2. If the flight path angle γ is less than the angle THETA2, a warning boundary 372 extends from the point 370 at angle THETA2 to the warning LAD. Should the flight path angle γ be greater than THETA2, a warning boundary 374 will extend at an angle equal to the flight path angle γ between the point 370 and the warning LAD.

Terrain Display

Figure 17:
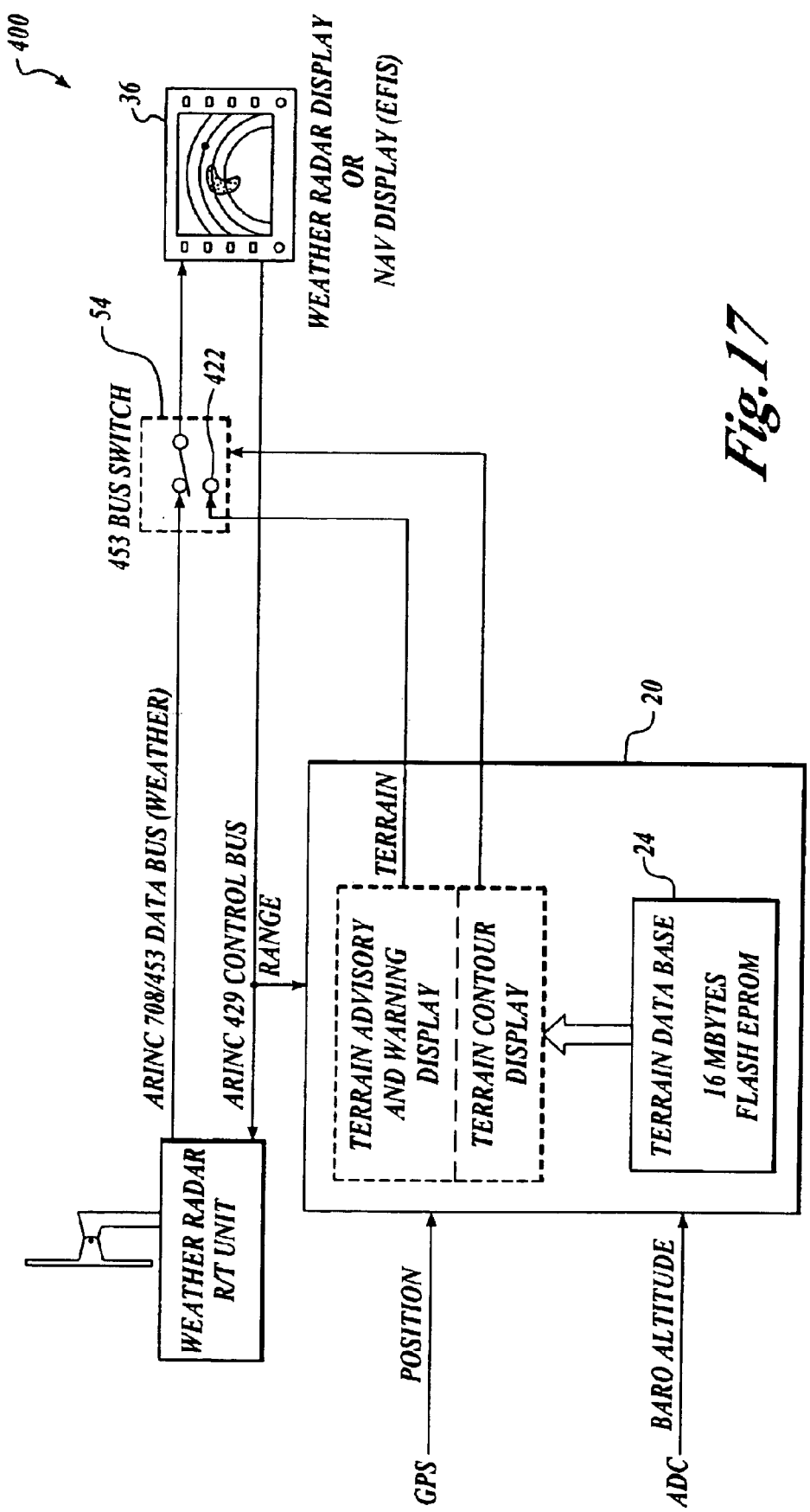
FIG. 17 is a functional block diagram of a terrain display system according to an embodiment of the present invention.
Figure 18:
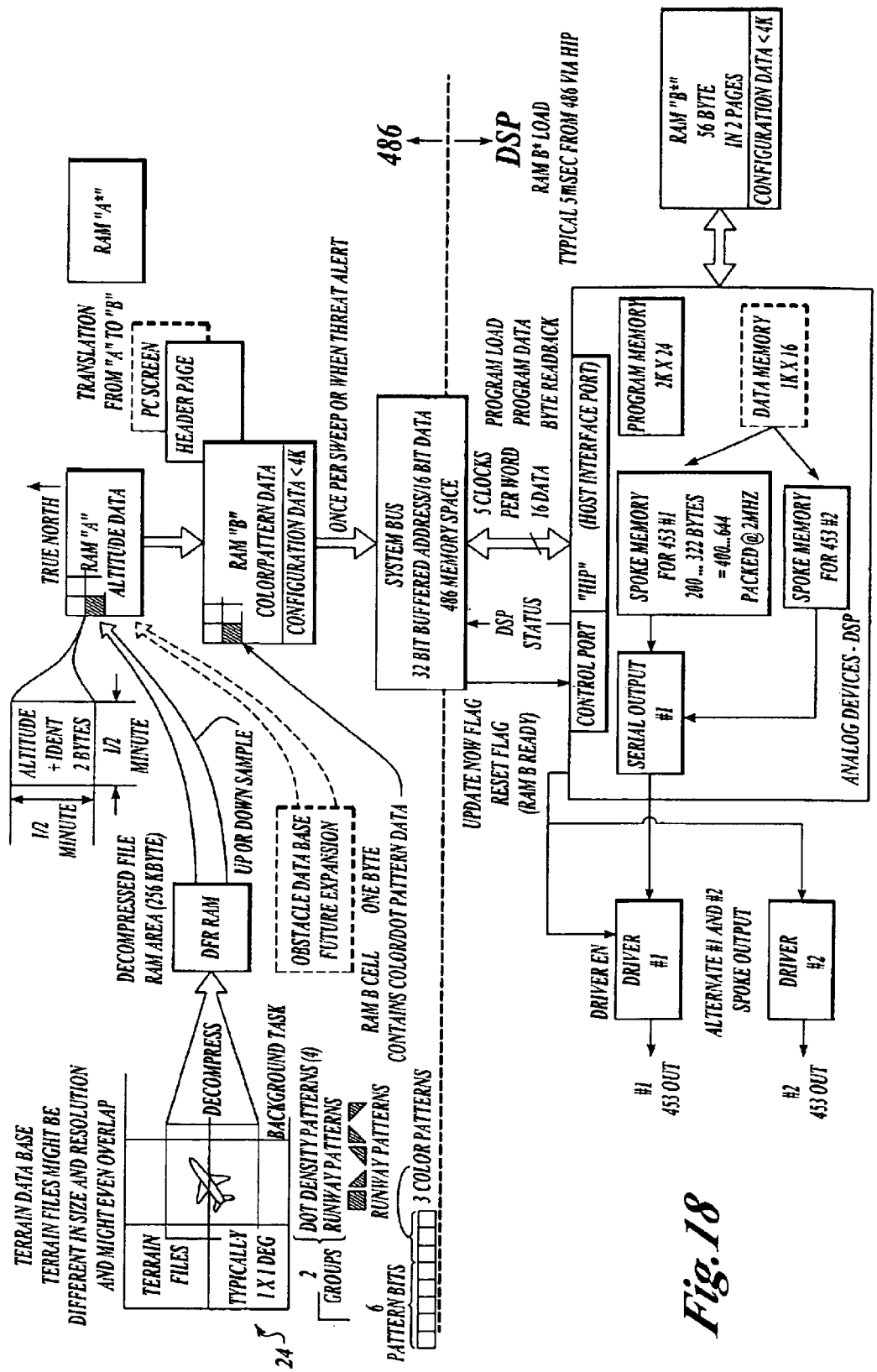
FIG. 18 is a block diagram of a display system according to an embodiment of the present invention.

A display system, generally identified with the reference numeral 400, is illustrated in FIGS. 17 and 18. FIG. 17 contains a top level functional diagram of the warning computer/display interface, while FIG. 18 represents a simplified block diagram for implementation of the display system 400 in accordance with the present invention. The display system 400 may include a microprocessor, for example, an Intel type 80486, 25 MHz type microprocessor ("486") and an Analog Devices type Digital Signal Processor (DSP). The DSP is primarily used for calculating the RHO/THETA conversions to off load the 486 microprocessor or to facilitate display of terrain delta on a display device typically used to display weather radar data in a RHO/THETA format. Additional, details on the construction of the terrain data display overlay matrices, terrain data files and display drivers may be found in U.S. Pat. No. 5,839,080 which has been incorporated herein by reference.

The display system 400 is used to provide a visual indication of terrain which penetrates the terrain caution and terrain warning envelopes as well as for display of terrain in the current vicinity of the aircraft. The background terrain information may be displayed using dot patterns whose density varies as a function of the elevation of the terrain relative to the altitude of the aircraft and color coded according to the degree of threat. Terrain located within the caution and warning envelopes may be displayed in solid colors, such as yellow and red.

Figure 19:
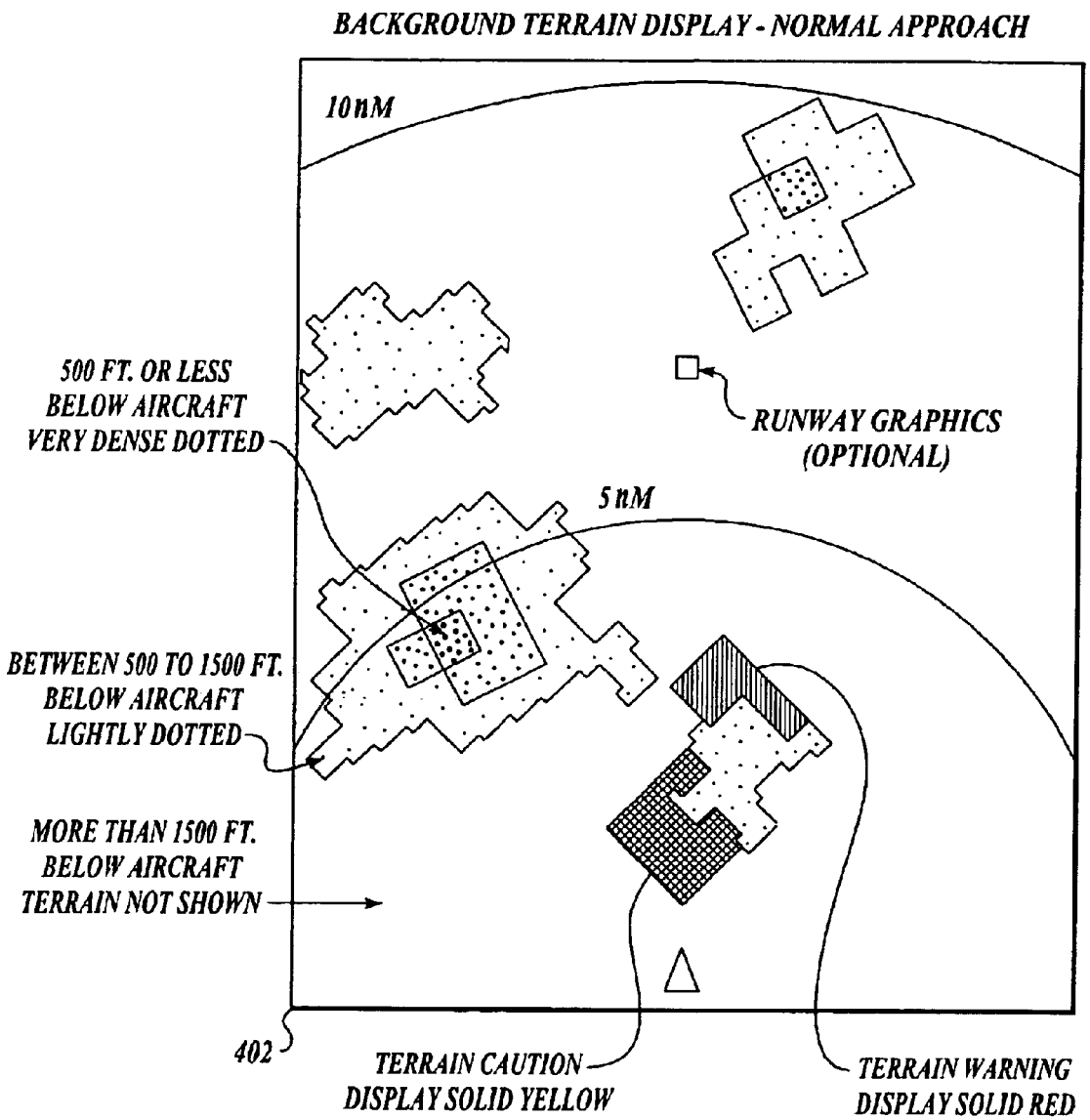
FIG. 19 illustrates depiction of background terrain on a display according to an embodiment of the present invention.

FIG. 19 illustrates how the terrain background information can be shown on the display 36. As will be discussed in more detail below, the elevation of the terrain relative to the altitude of the aircraft is shown as a series of colored dot patterns whose density varies as a function of the distance between the aircraft and the terrain. The colors are used to distinguish between terrain caution and terrain warning indications. For example, red may be used to represent a terrain warning indication while yellow or amber is used to represent a terrain advisory indication. By using colored shapes for terrain threat indications and dot patterns of variable density for the terrain background information, clutter of the display is minimized.

Figure 20:
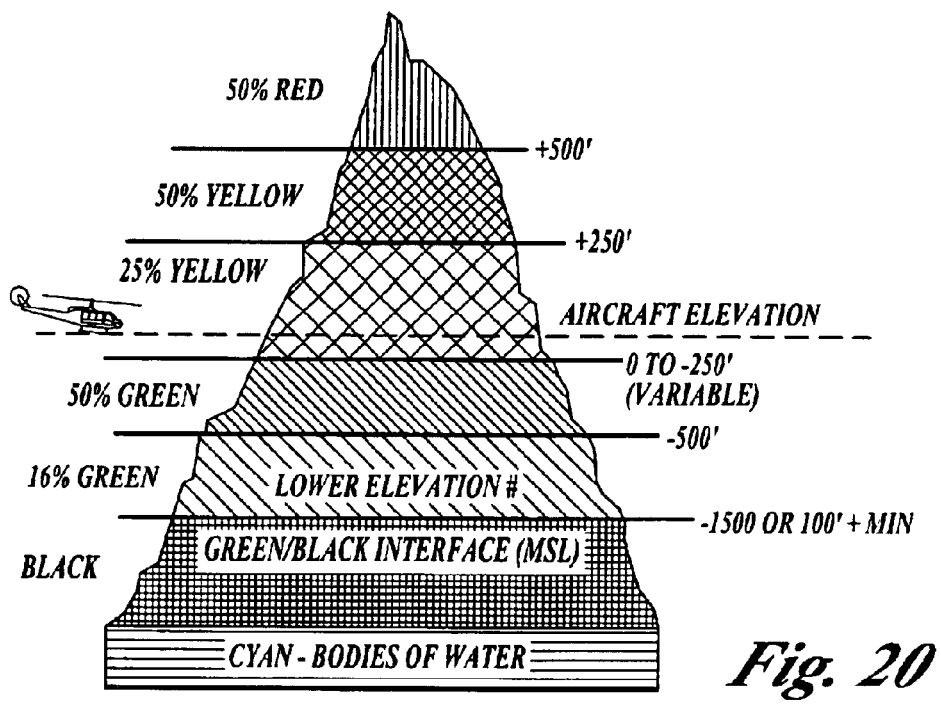
FIG. 20 illustrates a background terrain display color and dot pattern densities according to an embodiment of the present invention.

FIG. 20 illustrates display 36 color and dot pattern densities suitable for use with helicopters and other aircraft capable of off-airport landings. Terrain located more than 1500 feet below the aircraft is not shown. Terrain located between 500 and 1500 feet below the aircraft is shown in green with a dot pattern density of 16%. Terrain less than 500 feet below the aircraft but greater than a predetermined amount beneath the aircraft is shown in green with a dot pattern density of 50%.

The predetermined amount defines the boundary between where terrain is shown as green, indicating non-threatening terrain, and where terrain is shown as yellow indicating a potential hazard. According to the present invention, this predetermined value is ascertained as a function of the aircraft phase of flight. For example, during cruise, the yellow/green boundary is located 250 feet below the aircraft. The cruise phase can be identified by monitoring the groundspeed of the aircraft. In a preferred embodiment of the invention, cruise is identified as a condition where the groundspeed is equal to or exceeds 90 kts. During approach conditions, the yellow/green boundary is located at the aircraft altitude. In a preferred embodiment of the invention, groundspeeds between 40 and 90 kts are indicative of the approach condition. During hover or landing conditions, the yellow/green boundary is located at the current aircraft altitude. In a preferred embodiment of the invention, the hover condition is defined as a groundspeed below 40 kts. Preferably, the groundspeeds defining the hover and cruise conditions also form corner points 78 and 82 of the ΔH curve of FIG. 8. Terrain depicted in yellow above the yellow/green boundary is shown with a dot density of 25%. For terrain elevations located between 250 feet and 500 feet above the aircraft current altitude, the background terrain is colored yellow using a 50% dot density. Terrain elevations greater than 500 feet above the current aircraft elevation are colored red using a 50% dot density. Terrain located in the caution advisory envelope is colored solid yellow, while terrain located within the warning envelope is colored solid red. Bodies of water located at sea level may optionally be colored in cyan, or other shade of blue.

Figure 21:
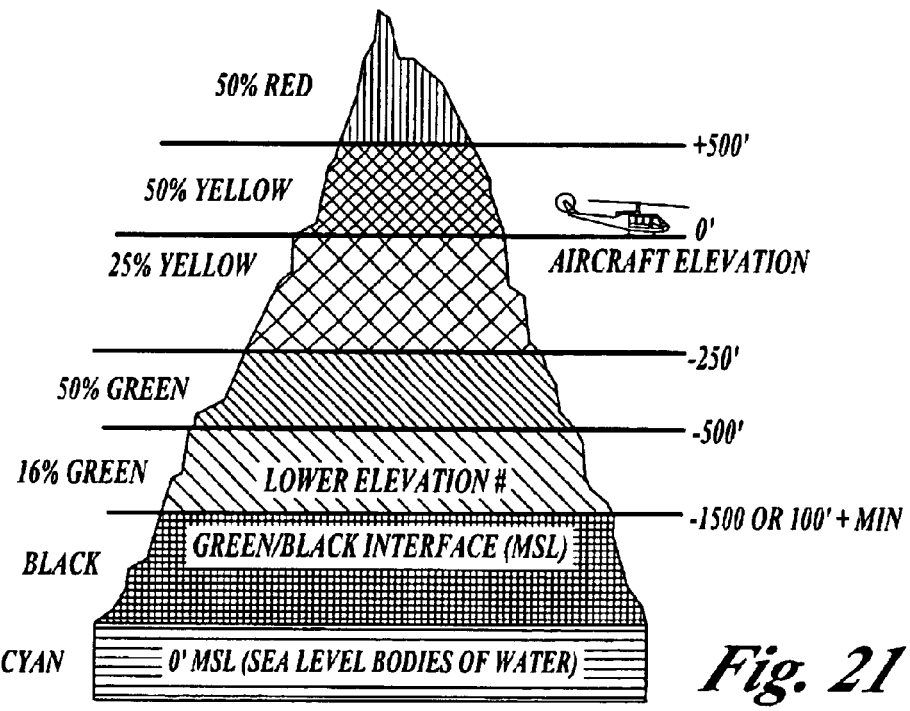
FIG. 21 illustrates an alternative background terrain display color and dot pattern densities according to an embodiment of the present invention.

FIG. 21 illustrates an alternative terrain display suitable for use with the present invention.

The present invention thus enables those aircraft capable of routine, safe, off-airport landings to land at a location other than an airport without flying through terrain that would otherwise be depicted as yellow or red on a terrain display for fixed wing aircraft. Overflying terrain that is depicted as yellow or red during off airport landings, can lead to complacency, and the pilot may ignore such a display in the future believing a safe condition exists when in reality it does not. The present invention thus permits the background terrain display to reflect a safe approach to an off airport landing by matching the display of potentially hazardous terrain to phase of flight. The present invention thus also preserves the depiction of terrain as hazardous, and assists in the prevention of CFIT accidents, when the approach and landing conditions do not exist and the pilot is in hazardous proximity to terrain.

The invention has now been described with reference to the preferred embodiments. Variations and modifications will be readily apparent to those of skill in the art. For this reason, the invention is to be interpreted in view of the claims.

What is claimed is:

1. An apparatus for alerting a pilot of a rotary wing aircraft of proximity to terrain, the apparatus comprising:
    an input for receiving signals representative of a position of the aircraft, a flight path angle of the aircraft and a speed of the aircraft, and coupled to a database of stored terrain information;
    an output;
    a signal processing device, coupled to said input, and coupled to said output, for:
    (a) defining a look ahead distance;
    (b) defining a first alert envelope, indicative of a first severity of terrain threat, wherein boundaries of said first alert envelope are determined as a first function of the flight path angle, said look ahead distance, and a terrain floor boundary; wherein said terrain floor boundary comprises a function of an aircraft altitude and said speed;
    (c) defining a second alert envelope, indicative of a second severity of terrain threat, wherein boundaries of said second alert envelope are determined as a second function of the flight path angle, said look ahead distance and said terrain floor boundary; and
    (d) outputting an alert signal when a subset of the stored terrain information is located within the boundaries of at least one of said first and said second alert envelopes.

2. The apparatus of claim 1 wherein at least one of said first and second alert envelopes is further bounded by a cut-off envelope.

3. The apparatus of claim 1 wherein said signals representative of the position of an aircraft include a first signal received from a satellite navigation system indicative of the aircraft altitude and a second signal representative of the aircraft altitude received from a source other than the satellite navigation system, and wherein said signal processing device further comprises a means for determining a compound altitude signal.

4. The apparatus of claim 1 wherein the boundaries of at least one of said first and second alert envelopes is further determined as a function of a configurable datum.

5. The apparatus of claim 1 wherein at least one of said first and second alert envelopes further comprises a subset of alert envelopes representing various severities of hazard to the aircraft.

6. The apparatus of claim 1 wherein said signal processing device comprises a microprocessor.

7. The apparatus of claim 1 wherein said signal processing device comprises a means for outputting said alert signal as a video control signal, wherein said video control signal is useful for controlling representation of terrain on a video display in various colors according to a degree of terrain threat.

8. The apparatus of claim 1 further comprising a voice warning generator coupled to said signal processor and wherein said alert signal output from said signal processing device comprises an audio control signal to command said voice warning generator to output an aural alert.

9. The apparatus of claim 1 wherein said speed comprises a groundspeed of the aircraft.

10. The apparatus of claim 1 wherein the aircraft is a tilt rotor.

11. The apparatus of claim 1 wherein said signal processing device further comprises a means for outputting a video control signal to control representation of a background terrain data proximate the aircraft:

in a first color for terrain located more than a predetermined amount relative to a current altitude of the aircraft wherein said predetermined amount is a first value for a cruise phase of flight and a second value for an approach phase of flight and a third value for a landing phase of flight; and in a second color for terrain located less than said predetermined amount relative to said current altitude.

12. The apparatus of claim 11 wherein said cruise, approach and landing phases are defined as a function of said speed of the aircraft.

13. The apparatus of claim 1 wherein said look ahead distance is a function of a distance to transition from a first phase of flight to a hover phase of flight.

14. A method for alerting a pilot of a rotary wing aircraft of proximity to terrain comprising the steps of:

accessing a database of terrain information;

receiving signals representative of a position of the aircraft, a flight path angle of the aircraft and a speed of the aircraft;

defining a look ahead distance;

defining a first alert envelope, indicative of a first severity of terrain threat, wherein boundaries of said first alert envelope are determined as a first function of the flight path angle, said look ahead distance, and a terrain floor boundary;

defining a second alert envelope, indicative of a second severity of terrain threat, wherein boundaries of said second alert envelope are determined as a second function of the flight path angle, said look ahead distance and said terrain floor boundary;

defining said terrain floor boundary as a function of an aircraft altitude and said speed; and outputting an alert signal when a subset of the stored terrain information is located within the boundaries of at least one of said first and said second alert envelopes.

15. The method of claim 14 wherein said step of outputting an alert signal further comprises the step of outputting a video control signal to control display of terrain on a display device.

16. The method of claim 14 further comprising the step of defining a cut-off envelope to form a boundary of at least one of said first and second alert envelopes.

17. The method of claim 14 further comprising the step of receiving a first and a second altitude signal from a distinct first and second sources respectively to obtain a compound altitude signal representative of the aircraft altitude.

18. The method of claim 14 wherein said step of outputting an alert signal comprises outputting an audio control signal to generate an aural alert.

19. The method of claim 14 further comprising the step of outputting a video control signal to control representation of terrain in a first color for terrain located more than a predefined amount relative to current altitude of the aircraft and in a second color for terrain located less than said predefined amount relative to said current altitude wherein said predefined amount is a first value for a cruise phase of flight, a second value for an approach phase of flight, and a third value for a landing phase of flight.

20. A computer program product for alerting a pilot of a rotary wing aircraft of proximity to terrain comprising:

a computer readable storage medium having computer readable program code means embodied in said medium, said computer readable program code means comprising:

a first computer instruction means for accessing a database of terrain information;

a second computer instruction means for accessing signals representative of a position of the aircraft, a flight path angle of the aircraft and a speed of the aircraft;

a third computer instruction means for defining a look ahead distance;

a fourth computer instruction means for defining a first alert envelope, indicative of a first severity of terrain threat, wherein boundaries of said first alert envelope are determined as a first function of the flight path angle, said look ahead distance, and a terrain floor boundary;

a fifth computer instruction means for defining a second alert envelope, indicative of a second severity of terrain threat, wherein boundaries of said second alert envelope are determined as a second function of the flight path angle, said look ahead distance and said terrain floor boundary;

a sixth computer instruction means for defining said terrain floor boundary as a function of an aircraft altitude and a said speed; and a seventh computer instruction means for outputting an alert signal when a subset of the stored terrain information is located within the boundaries of at least one of said first and said second alert envelopes.

21. The computer program product of claim 20 further comprising an eighth computer instruction means for outputting a video control signal to control display of terrain on a display device.

22. The computer program product of claim 20 further comprising an eighth computer instruction means for defining a cut-off envelope to form a boundary of at least one of said first and second alert envelopes.

23. The computer program product of claim 20 further comprising an eighth computer instruction means for accessing a first and a second altitude signal from a distinct first and second sources respectively to obtain a compound altitude signal representative of the aircraft altitude.

24. The computer program product of claim 20 wherein said seventh computer instruction means further comprises a means for outputting an audio control signal to generate an aural alert.

25. The computer program product of claim 20 further comprising an eighth computer instruction means for outputting a video control signal to control representation of terrain in a first color for terrain located more than a predefined amount relative to a current altitude of the aircraft and in a second color for terrain located less than said predefined amount relative to said current altitude wherein said predefined amount is a first value for a cruise phase of flight, a second value for an approach phase of flight, and a third value for a landing phase of flight.

26. An apparatus for alerting a pilot of a hover-capable aircraft of proximity to terrain, the apparatus comprising:
   an input for receiving signals representative of a position of the aircraft, a flight path angle of the aircraft and a speed of the aircraft, and coupled to a database of stored terrain information;
   an output;
   a signal processing device, coupled to said input, and coupled to said output, for:
   (a) defining a look ahead distance as a function of a distance to transition from a first phase of flight to a hover phase of flight;
   (b) defining a first alert envelope, indicative of a first severity of terrain threat, wherein boundaries of said first alert envelope are determined as a first function of the flight path angle, said look ahead distance, and a terrain floor boundary;
   (c) defining a second alert envelope, indicative of a second severity of terrain threat, wherein boundaries of said second alert envelope are determined as a second function of the flight path angle, said look ahead distance and said terrain floor boundary; and
   (d) outputting an alert signal when a subset of the stored terrain information is located within the boundaries of at least one of said first and said second alert envelopes.

27. The apparatus of claim 26 wherein at least one of said first and second alert envelopes is further bounded by a cut-off envelope.

28. The apparatus of claim 26 wherein said signals representative of the position of an aircraft include a first signal received from a satellite navigation system indicative of an aircraft altitude and a second signal representative of the aircraft altitude received from a source other than the satellite navigation system, and wherein said signal processing device further comprises a means for determining a compound altitude signal.

29. The apparatus of claim 26 wherein the boundaries of at least one of said first and second alert envelopes is further determined as a function of a configurable datum.

30. The apparatus of claim 26 wherein at least one of said first and second alert envelopes further comprises a subset of alert envelopes representing various severities of hazard to the aircraft.

31. The apparatus of claim 26 wherein said signal processing device comprises a microprocessor.

32. The apparatus of claim 26 wherein said signal processing device comprises a means for outputting said alert signal as a video control signal, wherein said video control signal is useful for controlling representation of terrain on a video display in various colors according to a degree of terrain threat.

33. The apparatus of claim 26 further comprising a voice warning generator coupled to said signal processor and wherein said alert signal output from said signal processing device comprises an audio control signal to command said voice warning generator to output an aural alert.

34. The apparatus of claim 26 wherein said speed comprises a groundspeed of the aircraft.

35. The apparatus of claim 26 wherein the aircraft is an airship.

36. The apparatus of claim 26 wherein the aircraft is a tilt rotor.

37. The apparatus of claim 26 wherein said signal processing device further comprises a means for outputting a video control signal to control representation of a background terrain data proximate the aircraft:
   in a first color for terrain located more than a predetermined amount relative to a current altitude of the aircraft wherein said predetermined amount is a first value for a cruise phase of flight and a second value for an approach phase of flight and a third value for a landing phase of flight; and
   in a second color for terrain located less than said predetermined amount relative to said current altitude.

38. The apparatus of claim 26 wherein said cruise, approach and landing phases are defined as a function of said speed of the aircraft.

39. A method for alerting a pilot of a hover-capable aircraft of proximity to terrain comprising the steps of:
   accessing a database of terrain information;
   receiving signals representative of a position of the aircraft, a flight path angle of the aircraft and a speed of the aircraft;
   defining a look ahead distance as a function of a distance to transition from a first phase of flight to a hover phase of flight;
   defining a first alert envelope, indicative of a first severity of terrain threat, wherein boundaries of said first alert envelope are determined as a first function of the flight path angle, said look ahead distance, and a terrain floor boundary;
   defining a second alert envelope, indicative of a second severity of terrain threat, wherein boundaries of said second alert envelope are determined as a second function of the flight path angle, said look ahead distance and said terrain floor boundary; and
   outputting an alert signal when a subset of the stored terrain information is located within the boundaries of at least one of said first and said second alert envelopes.

40. The method of claim 39 wherein said step of outputting an alert signal further comprises the step of outputting a video control signal to control display of terrain on a display device.

41. The method of claim 39 further comprising the step of defining a cut-off envelope to form a boundary of at least one of said first and second alert envelopes.

42. The method of claim 39 further comprising the step of receiving a first and a second altitude signal from a distinct first and second sources respectively to obtain a compound altitude signal representative of the aircraft altitude.

43. The method of claim 39 wherein said step of outputting an alert signal comprises outputting an audio control signal to generate an aural alert.

44. The method of claim 39 further comprising the step of outputting a video control signal to control representation of terrain in a first color for terrain located more than a predefined amount relative to a current altitude of the aircraft and in a second color for terrain located less than said predefined amount relative to said current altitude wherein said predefined amount is a first value for a cruise phase of flight, a second value for an approach phase of flight, and a third value for a landing phase of flight.

45. A computer program product for alerting a pilot of a hover-capable aircraft of proximity to terrain comprising:
   a computer readable storage medium having computer readable program code means embodied in said medium, said computer readable program code means comprising:
   a first computer instruction means for accessing a database of terrain information;
   a second computer instruction means for accessing signals representative of a position of the aircraft, a flight path angle of the aircraft and a speed of the aircraft;
   a third computer instruction means for defining a look ahead distance as a function of a distance to transition from a first phase of flight to a hover phase of flight;
   a fourth computer instruction means for defining a first alert envelope, indicative of a first severity of terrain threat, wherein boundaries of said first alert envelope are determined as a first function of the flight path angle, said look ahead distance, and a terrain floor boundary;
   a fifth computer instruction means for defining a second alert envelope, indicative of a second severity of terrain threat, wherein boundaries of said second alert envelope are determined as a second function of the flight path angle, said look ahead distance and said terrain floor boundary; and
   a sixth computer instruction means for outputting an alert signal when a subset of the stored terrain information is located within the boundaries of at least one of said first and said second alert envelopes.

46. The computer program product of claim 45 further comprising a seventh computer instruction means for outputting a video control signal to control display of terrain on a display device.

47. The computer program product of claim 45 further comprising a seventh computer instruction means for defining a cut-off envelope to form a boundary of at least one of said first and second alert envelopes.

48. The computer program product of claim 45 further comprising a seventh computer instruction means for accessing a first and a second altitude signal from a distinct first and second sources respectively to obtain a compound altitude signal representative of the aircraft altitude.

49. The computer program product of claim 45 wherein said sixth computer instruction means further comprises a means for outputting an audio control signal to generate an aural alert.

50. The computer program product of claim 45 further comprising a seventh computer instruction means for outputting a video control signal to control representation of terrain in a first color for terrain located more than a predefined amount relative to a current altitude of the aircraft and in a second color for terrain located less than said predefined amount relative to said current altitude wherein said predefined amount is a first value for a cruise phase of flight, a second value for an approach phase of flight, and a third value for a landing phase of flight.

51. An apparatus for alerting a pilot of a rotary wing aircraft of proximity to terrain comprising:
   an input for receiving signals representative of a position of the aircraft, a flight path angle of the aircraft and a speed of the aircraft, and coupled to a database of stored terrain information;
   an output; and
   a signal processor, coupled to said input and to said output for:
   (a) defining a look ahead/look down alert envelope, wherein boundaries of said alert envelope are determined as a function of the flight path angle, a look ahead distance, and a terrain floor boundary; wherein said terrain floor boundary comprises a function of an aircraft altitude and said speed, and wherein said look ahead distance comprises a function of a distance to transition from a first phase of flight to a hover phase of flight; and
   (b) outputting an alert signal when a subset of the stored terrain information is located within the boundaries of said alert envelope.

52. The apparatus of claim 51 wherein said look ahead/look down alert envelope further comprises a first, caution, envelope and a second, warning, envelope.

53. The apparatus of claim 52 wherein said signal processor outputs a first alert signal when said subset of the stored terrain information is located within the boundaries of said caution envelope and a second alert signal when said subset of the stored terrain information is located within the boundaries of said warning envelope.

54. The apparatus of claim 51 wherein said signal processor comprises a microprocessor.

55. The apparatus of claim 51 wherein said speed comprises a groundspeed of the aircraft.

56. The apparatus of claim 51 wherein said signal processing device comprises a means for outputting said alert signal as a video control signal, wherein said video control signal is useful for controlling representation of terrain on a video display in various colors according to a degree of terrain threat.

57. The apparatus of claim 51 further comprising a voice warning generator coupled to said signal processor and wherein said alert signal output from said signal processing device comprises an audio control signal to command said voice warning generator to output an aural alert.

58. The apparatus of claim 51 wherein said signal processing device further comprises a means for outputting a video control signal to control representation of a background terrain data proximate the aircraft:
   in a first color for terrain located more than a predetermined amount relative to a current altitude of the aircraft wherein said predetermined amount is a first value for a cruise phase of flight and a second value for an approach phase of flight and a third value for a landing phase of flight; and
   in a second color for terrain located less than said predetermined amount relative to said current altitude.

59. The apparatus of claim 58 wherein said cruise, approach and landing phases are defined as a function of said speed of the aircraft.

60. The apparatus of claim 51 wherein said signal processor further defines a look up envelope and outputs said alert signal when said subset of terrain is located within said look up envelope.

61. A method for alerting a pilot of a rotary wing aircraft of proximity to terrain comprising the steps of:
   receiving signals representative of a position of the aircraft, a flight path angle of the aircraft and a speed of the aircraft, and stored terrain information;
   defining a look ahead/look down alert envelope, wherein boundaries of said alert envelope are determined as a function of the flight path angle, a look ahead distance, and a terrain floor boundary; wherein said terrain floor boundary comprises a function of an aircraft altitude and a said speed, and wherein said look ahead distance comprises a function of a distance to transition from a first phase of flight to a hover phase of flight; and outputting an alert signal when a subset of the stored terrain information is located within said alert envelope.

62. The method of claim 61 wherein said look ahead/look down alert envelope further comprises a first caution envelope and a second warning envelope.

63. The method of claim 62 further comprising the steps of outputting a first alert signal when said subset of the stored terrain information is located within the boundaries of said caution envelope and outputting a second alert signal when said subset of the stored terrain information is located within the boundaries of said warning envelope.

64. The method of claim 61 further comprising the step of outputting a video control signal, wherein said video control signal is useful for controlling representation of terrain on a video display in various colors according to a degree of terrain threat.

65. The method of claim 61 further comprising the step of outputting an aural alert.

66. The method of claim 61 further comprising the step of outputting a video control signal to control representation on a display of a background terrain data proximate the aircraft:
  in a first color for terrain located more than a predetermined amount relative to a current altitude of the aircraft wherein said predetermined amount is a first value for a cruise phase of flight and a second value for an approach phase of flight and a third value for a landing phase of flight; and
  in a second color for terrain located less than said predetermined amount relative to said current altitude.

67. The method of claim 66 further comprising the step of defining said cruise, approach and landing phases as a function of said speed of the aircraft.

68. The method of claim 61 further comprising the step of defining a look up envelope and outputting said alert signal when said subset of terrain is located within said look up envelope.

69. A computer program product for alerting a pilot of a rotary wing aircraft of proximity to terrain comprising:
  a computer readable storage medium having computer readable program code means embodied in said medium, said computer readable program code means comprising:
  a first computer instruction means for accessing signals representative of a position of the aircraft, a flight path angle of the aircraft and a speed of the aircraft, and stored terrain information;
  a second computer instruction means for defining a look ahead/look down alert envelope, wherein boundaries of said alert envelope are determined as a function of the flight path angle, a look ahead distance, and a terrain floor boundary; wherein said terrain floor boundary comprises a function of an aircraft altitude and said speed, and wherein said look ahead distance comprises a function of a distance to transition from a first phase of flight to a hover phase of flight; and
  a third computer instruction means for outputting an alert signal when a subset of the stored terrain information is located within said alert envelope.

70. The computer program product of claim 69 wherein said second computer instruction means further defines said look ahead/look down alert envelope as comprising a first caution envelope and a second warning envelope.

71. The computer program product of claim 70 further comprising a fourth computer instruction means for outputting a first alert signal when said subset of the stored terrain information is located within the boundaries of said caution envelope and outputting a second alert signal when said subset of the stored terrain information is located within the boundaries of said warning envelope.

72. The computer program product of claim 69 further comprising a fourth computer instruction means for outputting a video control signal, wherein said video control signal is useful for controlling representation of terrain on a video display in various colors according to a degree of terrain threat.

73. The computer program product of claim 69 further comprising a fourth computer instruction means for outputting an aural alert.

74. The computer program product of claim 69 further comprising a fourth computer instruction means for outputting a video control signal to control representation on a display of a background terrain data proximate the aircraft:
  in a first color for terrain located more than a predetermined amount relative to a current altitude of the aircraft wherein said predetermined amount is a first value for a cruise phase of flight and a second value for an approach phase of flight and a third value for a landing phase of flight; and
  in a second color for terrain located less than said predetermined amount relative to said current altitude.

75. The computer program product of claim 74 further comprising a fifth computer instruction means for defining said cruise, approach and landing phases as a function of said speed of the aircraft.

76. The computer program product of claim 69 further comprising a fourth computer instruction means for defining a look up envelope and wherein said third computer instruction means outputs said alert signal when said subset of terrain is located within said look up envelope.

77. A ground proximity warning system for rotary wing aircraft comprising:
  a warning computer including:
  (a) an input for receiving signals representative of a position of the aircraft, a flight path angle of the aircraft and a speed of the aircraft, and coupled to a database of stored terrain information;
  (b) an output; and
  (c) a signal processor, coupled to said input and to said output for:
    (i) defining an alert envelope, wherein boundaries of said alert envelope are determined as a function of the flight path angle, a look ahead distance, and a terrain floor boundary; wherein said terrain floor boundary comprises a function of an aircraft altitude and said speed, and wherein said look ahead distance comprises a function of a distance to transition from a first phase of flight to a hover phase of flight; and
    (ii) outputting an alert signal when a subset of the stored terrain information is located within the boundaries of said alert envelope; and
  a display, having an display input coupled to said output of said warning computer, for displaying said terrain data proximate the aircraft in various colors according to a degree of terrain threat.

78. The system of claim 77 wherein said warning computer comprises a general purpose processor.

79. The system of claim 77 wherein said speed comprises a groundspeed of the aircraft.

80. The system of claim 77 wherein the aircraft is a tilt rotor.

81. A ground proximity warning system for rotary wing aircraft comprising:

a warning computer including:
- (a) an input for receiving signals representative of a position of the aircraft, a flight path angle of the aircraft and a speed of the aircraft, and coupled to a database of stored terrain information;
- (b) an output; and
- (c) a signal processor, coupled to said input and to said output for:
  - (i) defining an alert envelope, wherein boundaries of said alert envelope are determined as a function of the flight path angle, a look ahead distance, and a terrain floor boundary; wherein said terrain floor boundary comprises a function of an aircraft altitude and said speed, and wherein said look ahead distance comprises a function of a distance to transition from a first phase of flight to a hover phase of flight; and
  - (ii) outputting an alert signal when a subset of the stored terrain information is located within the boundaries of said alert envelope; and a display, having an display input coupled to said output of said warning computer, for:
- (a) displaying said terrain data located in the boundaries of said alert envelope in various colors according to a degree of terrain threat; and
- (b) displaying terrain data proximate the aircraft:
  - (i) in a first color for terrain located more than a predetermined amount relative to a current altitude of the aircraft wherein said predetermined amount is a first value for a cruise phase of flight and a second value for an approach phase of flight and a third value for a landing phase of flight; and
  - (ii) in a second color for terrain located less than said predetermined amount relative to said current altitude.

82. The system of claim 77 wherein the aircraft is a tilt rotor.

83. The method of claim 14 wherein said speed comprises a groundspeed of the aircraft.

84. The computer program product of claim 20 wherein said speed comprises a groundspeed of the aircraft.

85. The method of claim 39 wherein said speed comprises a groundspeed of the aircraft.

86. The computer program product of claim 45 wherein said speed comprises a groundspeed of the aircraft.

87. The method of claim 61 wherein said speed comprises a groundspeed of the aircraft.

88. The computer program product of claim 69 wherein said speed comprises a groundspeed of the aircraft.

89. The method of claim 1 wherein said look ahead distance comprises a function of a distance to a nearest runway.

* * * * *